(12) United States Patent
Shankman

(10) Patent No.: US 6,381,656 B1
(45) Date of Patent: Apr. 30, 2002

(54) METHOD AND APPARATUS FOR MONITORING INPUT/OUTPUT ("I/O") PERFORMANCE IN I/O PROCESSORS

(75) Inventor: Gary S. Shankman, Redmond, WA (US)

(73) Assignee: Applied Microsystems Corporation, Redmond, WA (US)

(*) Notice: Subject to any disclaimer, the term of this patent is extended or adjusted under 35 U.S.C. 154(b) by 0 days.

(21) Appl. No.: 09/265,199

(22) Filed: Mar. 10, 1999

(51) Int. Cl.[7] .............................................. G06F 13/14
(52) U.S. Cl. .............................. 710/18; 710/36; 710/60
(58) Field of Search ................................ 710/5, 36, 52, 710/56, 57, 15, 18, 19, 20, 38, 60; 714/29, 43

(56) References Cited

U.S. PATENT DOCUMENTS

| | | | |
|---|---|---|---|
| 5,699,426 A | * 12/1997 | Tsukamoto et al. | |
| 5,842,172 A | * 11/1998 | Wilson | |
| 5,913,037 A | * 6/1999 | Spofford et al. | |
| 5,983,371 A | * 11/1999 | Lord et al. | 714/55 |
| 6,049,828 A | * 4/2000 | Dev et al. | |
| 6,154,794 A | * 11/2000 | Abdalla et al. | 710/29 |
| 6,301,625 B1 | * 10/2001 | McDonald et al. | 710/5 |

* cited by examiner

Primary Examiner—Paul R. Myers
(74) Attorney, Agent, or Firm—Seed IP Law Group, PLLC

(57) ABSTRACT

A method and system for monitoring performance of an input/output ("I/O") processor in a server associated with a computing system, such as an intelligent I/O ("$I_2O$") compliant computer system. A virtual adapter in the I/O processor monitors messages passing through the I/O processor to produce message data. An I/O monitor associated with each server in the computing system constructs a server communications model for its respective server using the message data provided by each of the virtual adapters associated with the I/O processors in the server. The I/O monitor may also collect information regarding non-$I_2O$ devices. An I/O user interface builds a computing system communications model using the server communications models provided by the respective I/O monitors in each of the computing system's servers. The I/O user interface provides selectable views for the computing system communications model and the server communications model for each of the servers in the computing system. The I/O user interface also provides controls for adjusting the operating characteristics of the virtual adapters in the I/O processors and for adjusting operating characteristics of the I/O monitors in the servers. The virtual adapters are visible throughout the computing system by appearing to the other components of the computing system as disk drives.

70 Claims, 10 Drawing Sheets

METHOD AND APPARATUS FOR MONITORING INPUT/OUTPUT ("I/O") PERFORMANCE IN I/O PROCESSORS

TECHNICAL FIELD

The invention relates to a computer input/output ("I/O") subsystem monitor for testing, debugging and performance analysis and, more particularly, to I/O subsystem monitoring in computing systems using an intelligent I/O ("$I_2O$") architecture.

BACKGROUND OF THE INVENTION

Personal computers have evolved considerably since their widespread introduction in the late 1970's. Personal computers presently perform many functions that are not strictly "personal" and increasingly undertake ever more sophisticated tasks. Personal computers are even being applied in arenas traditionally occupied by mainframe computers and UNIX-based workstations. As personal computers continue growing in processing power, they are increasingly finding use as servers in computer networks. A server is essentially a personal computer having larger amounts of local memory than a conventional desktop personal computer that allow the server to process greater volumes of input/output ("I/O") than a conventional desktop personal computer. Input and output comprise two of the three functions performed by computers (the other is processing). I/O describes the interrelated tasks of providing information to the computer (input) and providing the results of processing to the user (output).

Server I/O predominantly consists of network and disk drive I/O activity, although not strictly limited to these two tasks. A network comprises a group of computers and associated devices connected together by communications facilities, such as those provided by a server. A disk drive may serve as both an input device and an output device since it can both provide information to the computer and receive information from the computer. A device driver comprises a software component that permits a computer to communicate with a device, such as a specific manufacturer's disk drive.

In a conventional personal computer architecture, each I/O request activates an I/O interrupt in the personal computer's central processing unit ("CPU") that causes the CPU to stop its present task, flush its instruction pipeline and then service the I/O interrupt. The CPU performs all of the work in a personal computer, interpreting and executing received programming instructions. At any given time, the CPU's instruction pipeline contains programming instructions in various stages of being fetched, decoded, and processed. A simple disk drive I/O access may invoke multiple I/O interrupts. While a single I/O interrupt will typically not produce noticeable performance degradation in a personal computer, a heavy amount of I/O interrupts, such as commonly experienced by a server, can provoke severe performance degradation. Performance degradation may be exacerbated in some recently developed CPUs, such as the Pentium® processor, having deeply pipelined structures that were not designed for optimum performance with frequent I/O interrupts.

To reduce the performance degradation due to heavy I/O interrupt activity in personal computers operating as servers, a consortium of companies formed an intelligent I/O special interest group ("$I_2O$ SIG") with the express purposes of developing a more efficient I/O subsystem architecture. This consortium developed a specification for an I/O architecture called "intelligent I/O," which is also known as "$I_2O$." The $I_2O$ architecture's essential concept is that a server's CPU should only receive I/O interrupts that pertain to data ready for processing. The $I_2O$ architecture somewhat mimics a conventional mainframe computer's architecture in which specialized processors and their associated software perform various I/O subsystem tasks. The $I_2O$ architecture also includes in its operating system an additional layer for communications. The $I_2O$ communications layer provides generic support for any type of device driver.

The $I_2O$ architecture offloads the interrupts generated by I/O devices to special purpose I/O processors ("IOPs") that have been designed to quickly service interrupts and protect the server's CPU from the performance degradations associated with I/O interrupts in the conventional personal computer architecture. The $I_2O$ architecture also reduces the software support burden on I/O card manufacturers that had essentially been imposed because of the conventional personal computer architecture.

In an $I_2O$ compliant architecture, the operating system communicates I/O requests to an I/O subsystem that contains one or more IOPs using a series of predefined and consistently formatted messages. Accordingly, all $I_2O$ compliant I/O devices understand the $I_2O$ message format. Thus, the I/O subsystems in the $I_2O$ architecture operate separately from the server's CPU. An operating system controls the allocation and usage of hardware resources such as memory, CPU time, disk space, and peripheral devices. Well-known personal computer operating systems include WINDOWS 95® and UNIX.

FIG. 1 illustrates a computer network comprised of personal computer servers utilizing the $I_2O$ architecture. A computer network 100 comprises three servers 101, 102, and 103 each designed in compliance with the $I_2O$ architecture. The server 101 utilizes three IOPs 104, 105, and 106. The server 102 utilizes two IOPs 107 and 108. The server 103 also utilizes two IOPs 109 and 110. The computer network 100 may include functionality that balances the I/O load among the servers 101, 102, and 103 and among the IOPs 104–110. For the reasons discussed above, a CPU $I_2O$ in the computer network 100 operates with greater efficiency than it would in a conventional personal computer architecture due to the presence of the IOPs 104–110 that process the I/O interrupts received in the computer network 100.

Conventional personal computer architectures prior to the $I_2O$ architecture facilitated the ready extraction of diagnostic information related to device drivers and I/O communications since all I/O message traffic passed through the personal computer's CPU. An external diagnostic application could easily collect the statistical information related to a device driver's performance because all underlying communications ran through the operating system and the CPU. Accordingly, all conventional I/O performance data was essentially local information.

In contrast, the $I_2O$ architecture does not provide a centralized mechanism for monitoring I/O performance because I/O activity occurs in a plethora of decentralized IOPs. Moreover, the $I_2O$ architecture imposes no practical limits on the number of IOPs in a computing system. As a result of the change from the conventional personal computer architecture to the $I_2O$ architecture, the conventional methods for measuring I/O performance and operations have been rendered obsolete. Despite the change in personal computer architecture, a need nevertheless remains for measuring overall computing system performance and I/O subsystem communications performance.

SUMMARY OF THE INVENTION

The inventive method and apparatus monitors message traffic passing through the input/output ("I/O") processors within servers in a computing system in order to analyze the I/O processing within the computing system as a whole. A virtual adapter associated with each I/O processor ("IOP") in the computing system's servers monitors messages passing through its respective IOP to produce message summary data. The servers may include an I/O monitor that generates a server communications model for its respective server using the message summary data provided by the virtual adapters in the server's IOPs, according to an embodiment of the invention. An I/O user interface develops a computer communications model based upon the server communications models for the servers within the computing system or by directly examining the message summary data in the virtual adapters. The I/O user interface also provides selectable views of the server communications models for each of the computing system's servers and for the computer communications model.

The virtual adapters include programming code that allows them to insert themselves within the message traffic passing through an IOP from various $I_2O$ compliant devices within a server. Once inserted into an IOP's operating environment, the virtual adapter may begin monitoring message traffic in the IOP. A virtual adapter in a server's IOP may be accessed throughout the entire computing system by generating a virtual disk drive that is available to the other elements of the computing system. The virtual disk drives contain virtual files, and reading from a virtual file causes information to be sent from the virtual adapter while writing to a virtual file may change the virtual adapter's configuration settings.

The I/O user interface may alter the performance characteristics for each of the virtual adapters and for each of the I/O monitors in the computing system. The I/O user interface also provides selectable views of the various server communications models and the computing system communications model. These views may be tailored for specific consumers of computing system communications information, such as the detailed views required by an engineer performing systems integration work or analyzing performance variations from one manufacturer's product to another. The I/O user interface may perform trend analysis regarding the messages passing through the computing system. The I/O user interface also provides selectable filters for viewing message traffic passing through the computing system.

BRIEF DESCRIPTION OF THE DRAWINGS

Aspects of the invention will be described below relative to the following figures. Note that similar elements and steps in the figures have the same reference number.

DETAILED DESCRIPTION OF THE INVENTION

The disclosed embodiment of the invention provides a message monitoring and retrieval system whose elements are distributed throughout the input/output ("I/O") subsystems of an intelligent I/O ("$I_2O$") compliant architecture. A virtual adapter inserts itself into the message stream of an I/O processor ("IOP") and may then monitor $I_2O$ messages passing through the IOP. An "adapter" in $I_2O$ parlance comprises any hardware entity compliant with the $I_2O$ architecture. The virtual adapter is "virtual" because it does not necessarily exist in hardware but may instead exist as software that resembles a hardware device to the other elements of the computing system. For example, the virtual adapter may appear to be a disk drive to the other elements of the computing system, according to an embodiment of the invention. By appearing to be a disk drive, the virtual adapter may be accessed throughout the computing system and any associated networks.

The $I_2O$ message monitoring system may also include I/O monitors that reside in each server of the computing system and monitor non-$I_2O$ devices and communicate with virtual adapters present in the server. The virtual adapter time stamps $I_2O$ messages and records them locally for further analysis. An analyzer either resident on the virtual adapter or in the I/O monitor analyzes the $I_2O$ messages.

An I/O user interface summarizes the computing system's I/O system performance and may also summarize the performance of a specific server or IOP. The I/O user interface configures the I/O monitor resident on any given server in the computing system and also configures the virtual adapters. The I/O user interface provides I/O system performance data in various formats, each of which may provide communications data abstracted for a particular audience. For example, one format depicts $I_2O$ message data in a manner that maximizes its utility to a software developer. Another I/O user interface format provides detailed I/O system performance measurements for an engineer performing system integration or looking for performance variations from one manufacturer's product to another. The I/O user interface also operates as a computer system management application for use by a computing systems administrator or information technology ("IT") manager.

Figure 1:
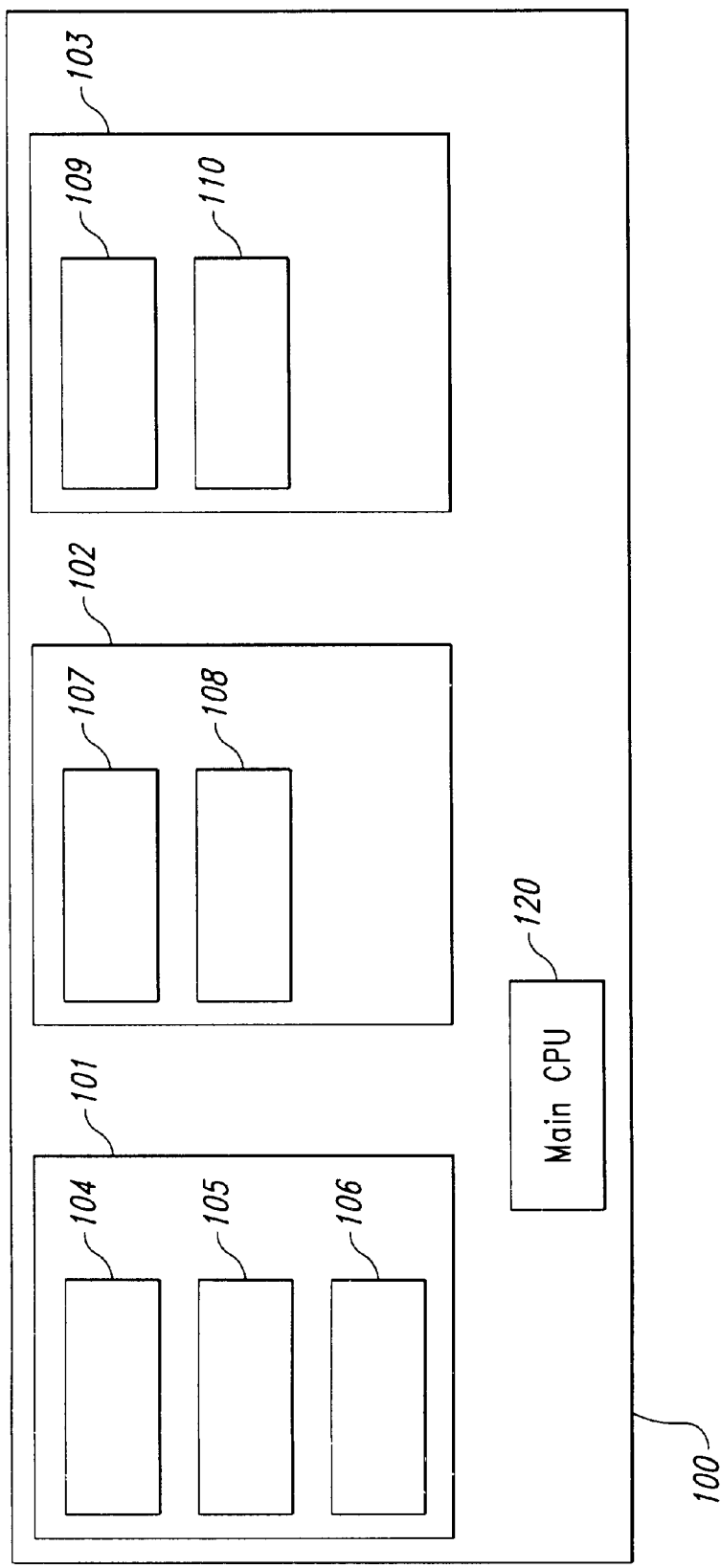
FIG. 1 illustrates a computer network comprised of personal computer servers utilizing the intelligent input/output ("$I_2O$") architecture.
Figure 2:
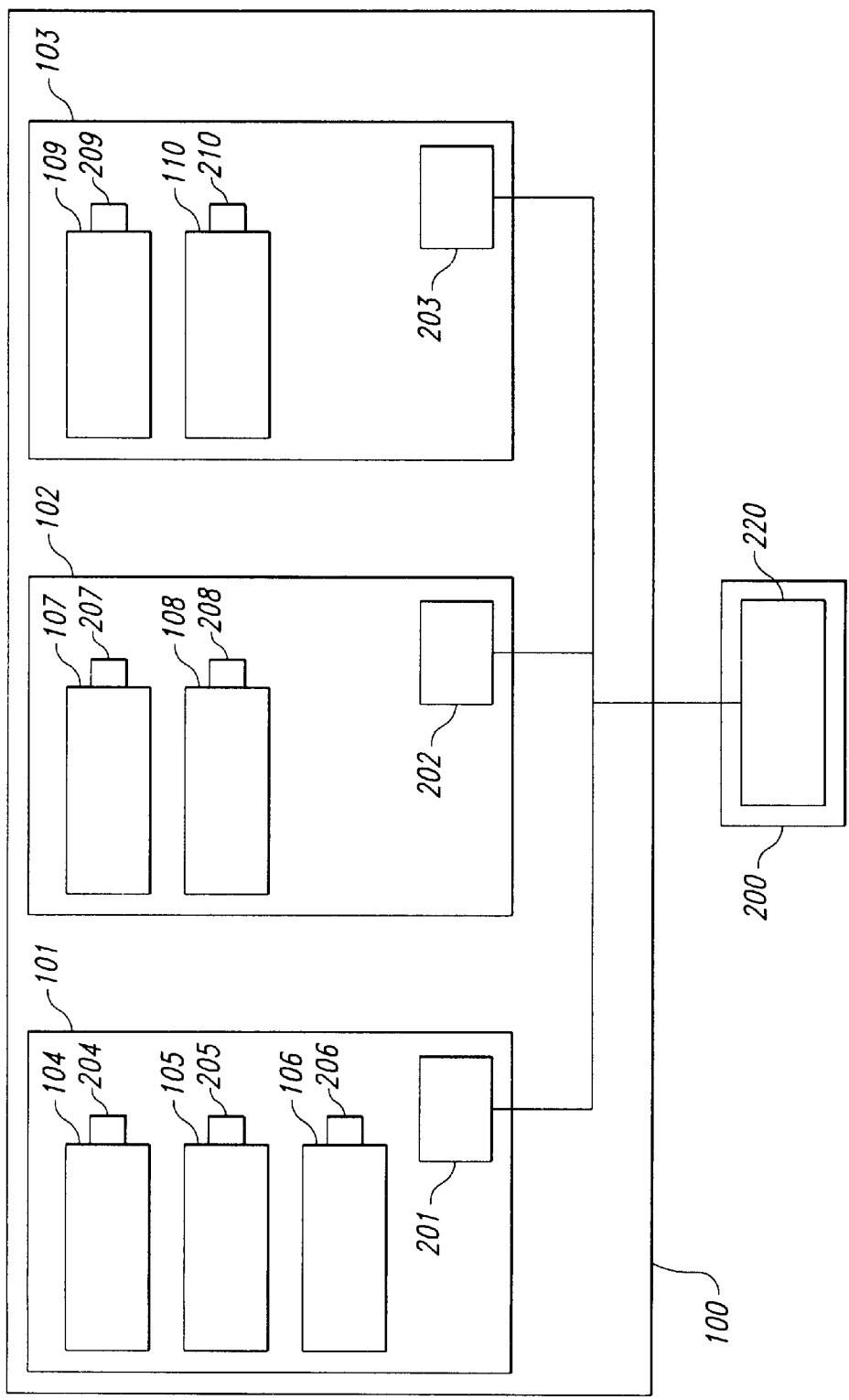
FIG. 2 illustrates an embodiment of the invention applied to the $I_2O$ computing system architecture shown in FIG. 1.

FIG. 2 illustrates an embodiment of the invention applied to the $I_2O$ computer network shown in FIG. 1. Virtual adapters 204–210 have been respectively attached to the IOPs 104–110. When activated, each of the virtual adapters 204–210 monitors $I_2O$ messages processed by the IOPs 104–110. Each of the servers 101–103 respectively includes an I/O monitor 201–203. The I/O monitors 201–203 each receive $I_2O$ message communication data from the virtual adapters on its server. For example, the I/O monitor 201 on the server 101 may receive communications summary data from the virtual adapters 204–206. The I/O monitors 201–203 may also monitor communications from non-$I_2O$ devices on their respective servers. The I/O monitors 201–203 provide an I/O user interface 220 running on a workstation 200 with communications information regarding their respective servers 101–103. The I/O user interface 220 constructs a communications model for the entire computer network 100 using $I_2O$ message data from the virtual adapters and server data provided by the I/O monitors. The I/O user interface 220 may also construct a server communications model for any one of the servers 101–103, as well as the respective I/O monitor for the servers 101–103.

Figure 3A:
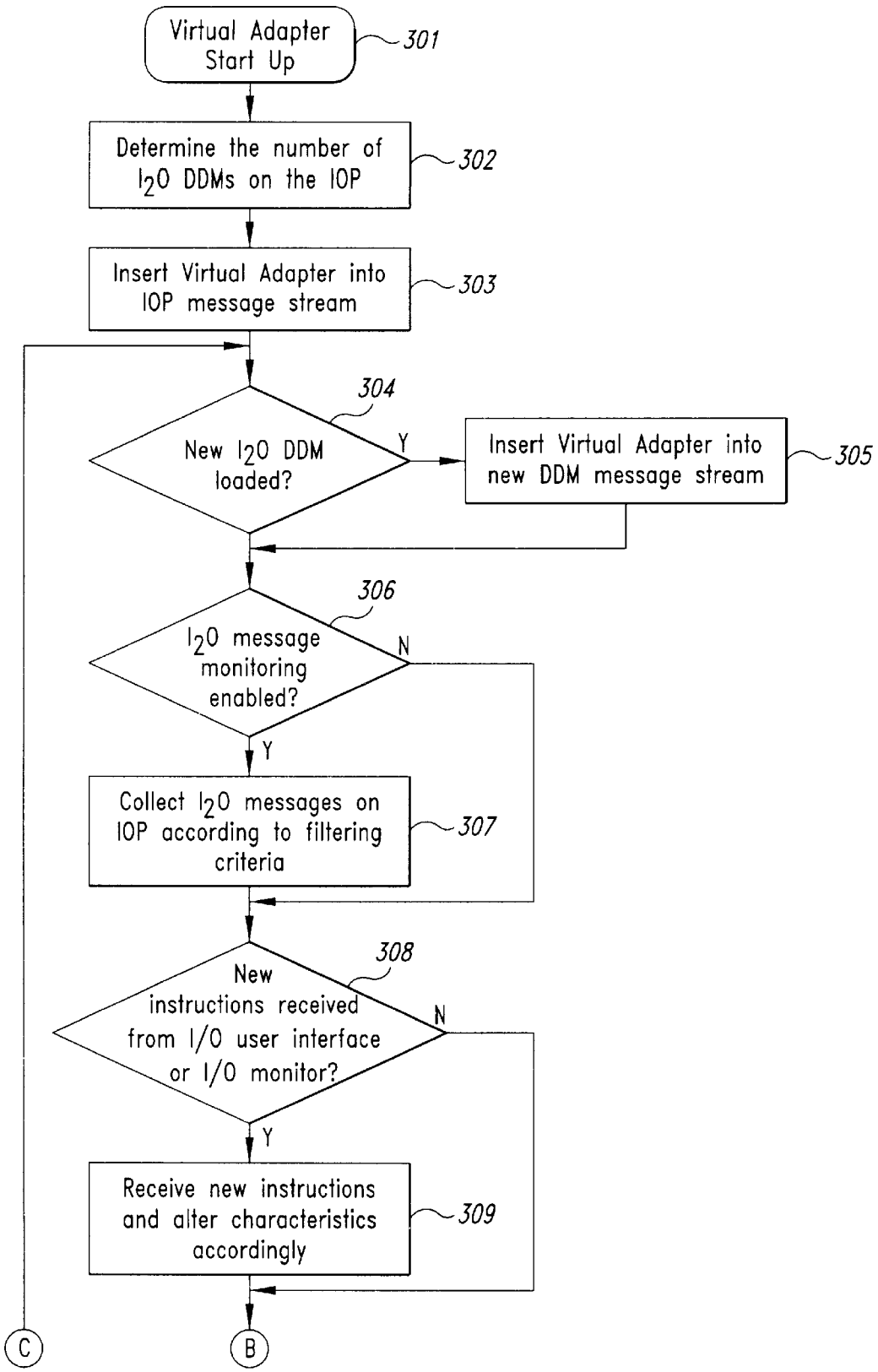
FIGS. 3A–3B are flowcharts depicting operations of a virtual adapter, according to an embodiment of the invention.
Figure 3B:
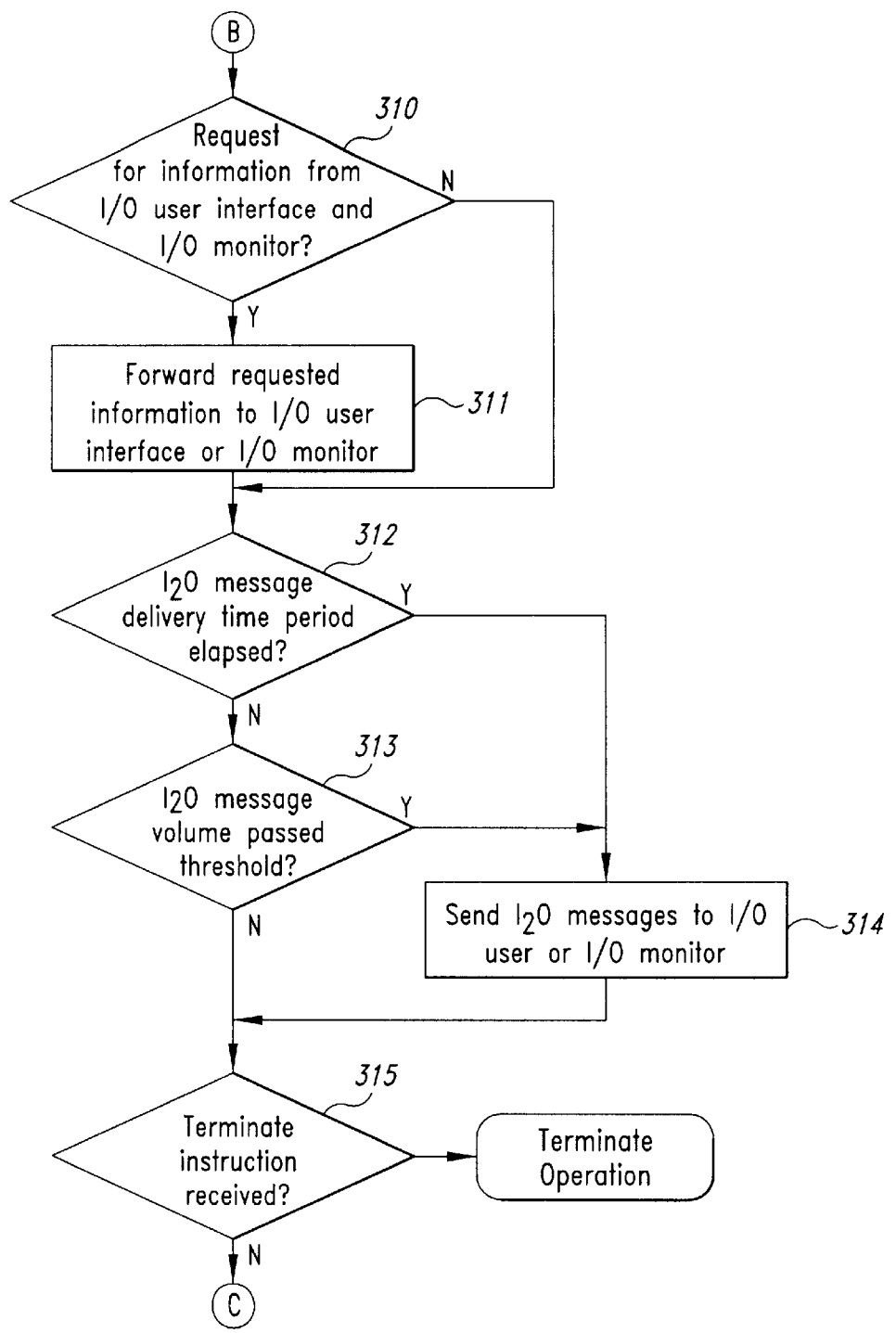

FIGS. 3A–3B are flowcharts depicting operations of a virtual adapter. A virtual adapter may be installed on an IOP board, and a complete $I_2O$ message monitoring system comprises multiple virtual adapters, one for each IOP that has been installed in the computing system. The I/O user interface may access all of the installed virtual adapters, and each I/O monitor may access all of the installed virtual adapters on its server.

A virtual adapter installs itself in an IOP as a "virtual" $I_2O$ device driver in order to become selectable by the I/O user interface and the I/O monitor. The virtual adapter appears to the other computing system elements as an IOP block storage device, according to an embodiment of the invention. Because the virtual adapter appears as an IOP block storage device, the I/O user interface and the I/O monitor may attach, open, read, and write to the virtual adapter as if it were an IOP block storage device. The virtual adapter may be readable and writable from within the computing system without requiring preliminary manual initialization (e.g., disk formatting) by a user or a system administrator. The virtual adapter executes within the IOP once installed.

Upon virtual adapter start up (step 301), the virtual adapter determines the number and type of $I_2O$ device driver modules ("DDMs") presently running on its respective IOP (step 302). The I/O monitor may provide the virtual adapter with information regarding the $I_2O$ DDMs on the server. The virtual adapter next inserts itself into the execution flow of both incoming and outgoing $I_2O$ messages for all of the detected $I_2O$ devices on its IOP (step 303). The virtual adapter initially captures no $I_2O$ messages at all and performs no further tasks until receiving further instructions from the I/O user interface or the I/O monitor, according to an embodiment of the invention.

The virtual adapter detects (step 304) when new $I_2O$ DDMs are loaded and initialized on the IOP subsequent to the virtual adapter's initial start up. Accordingly, the virtual adapter inserts itself into the execution flow of incoming and outgoing $I_2O$ messages for the new $I_2O$ DDMs (step 305).

When $I_2O$ monitoring has been enabled (step 306), the virtual adapter collects all $I_2O$ messages received in the IOP that match the virtual adapter's filtering criteria (step 307). Both the I/O user interface and I/O monitor may instruct the virtual adapter to begin capturing $I_2O$ messages. For example, the I/O user interface may instruct the virtual adapter to begin capturing $I_2O$ messages on a subsequent start up of the virtual adapter's IOP, according to an embodiment of the invention.

The virtual adapter detects instructions received from either the I/O user interface or the I/O monitor (step 308). For example, the virtual adapter may receive a device-level filtering instruction from the I/O user interface. The virtual adapter receives its new instructions and alters its operating characteristics accordingly (step 309). For example, when the virtual adapter receives a request to adjust its filtering criteria to include a new $I_2O$ DDM, the virtual adapter alters its filtering criteria accordingly. The virtual adapter may also receive instructions regarding its own internal operating parameters from the I/O user interface and I/O monitor.

The virtual adapter detects information requests sent by both the I/O user interface and the I/O monitor (step 310). The virtual adapter then forwards the requested information to the I/O user interface or I/O monitor, as appropriate (step 311). For example, the I/O user interface may request from the virtual adapter IOP's DDM configuration information, virtual adapter status information, and collected $I_2O$ messages.

The virtual adapter also transmits collected $I_2O$ messages to the I/O user interface or I/O monitor when one of two conditions has been met. The first of these two conditions arises when the virtual adapter determines that a preconfigured time period has elapsed since the virtual adapter last passed a group of collected $I_2O$ messages to the I/O user interface or I/O monitor (step 312). The second condition arises when the virtual adapter determines that the volume of collected $I_2O$ messages has reached or surpassed a message volume threshold previously specified by the I/O user interface or I/O monitor (step 313). Upon the occurrence of either of these conditions (step 312 or step 313), the virtual adapter will send the collected $I_2O$ messages to the I/O user interface or I/O monitor as directed (step 314). Steps 312 and 313 prevent $I_2O$ messages from being dropped at the end of a series of I/O transactions. Both the I/O user interface and the I/O monitor typically have access to larger storage areas than a virtual adapter and are accordingly better suited for retaining large amounts of $I_2O$ message data. Once the virtual adapter has passed a group of collected $I_2O$ messages to the I/O user interface or the I/O monitor, the virtual adapter discards the $I_2O$ messages in order to store newly received $I_2O$ messages.

The virtual adapter repeats steps 304–314 until its termination. A virtual adapter terminates upon termination of its respective IOP, server, or the computing system as a whole. In addition, the I/O monitor and the I/O user interface may instruct a virtual adapter to terminate (step 315). Termination of the virtual adapter's operations may occur at any time due to termination of the IOP, the server or the computing system, and the virtual adapter will typically not receive prior warning that it would be shut down. Accordingly, the virtual adapter will frequently save critical information in persistent storage.

Figure 4:
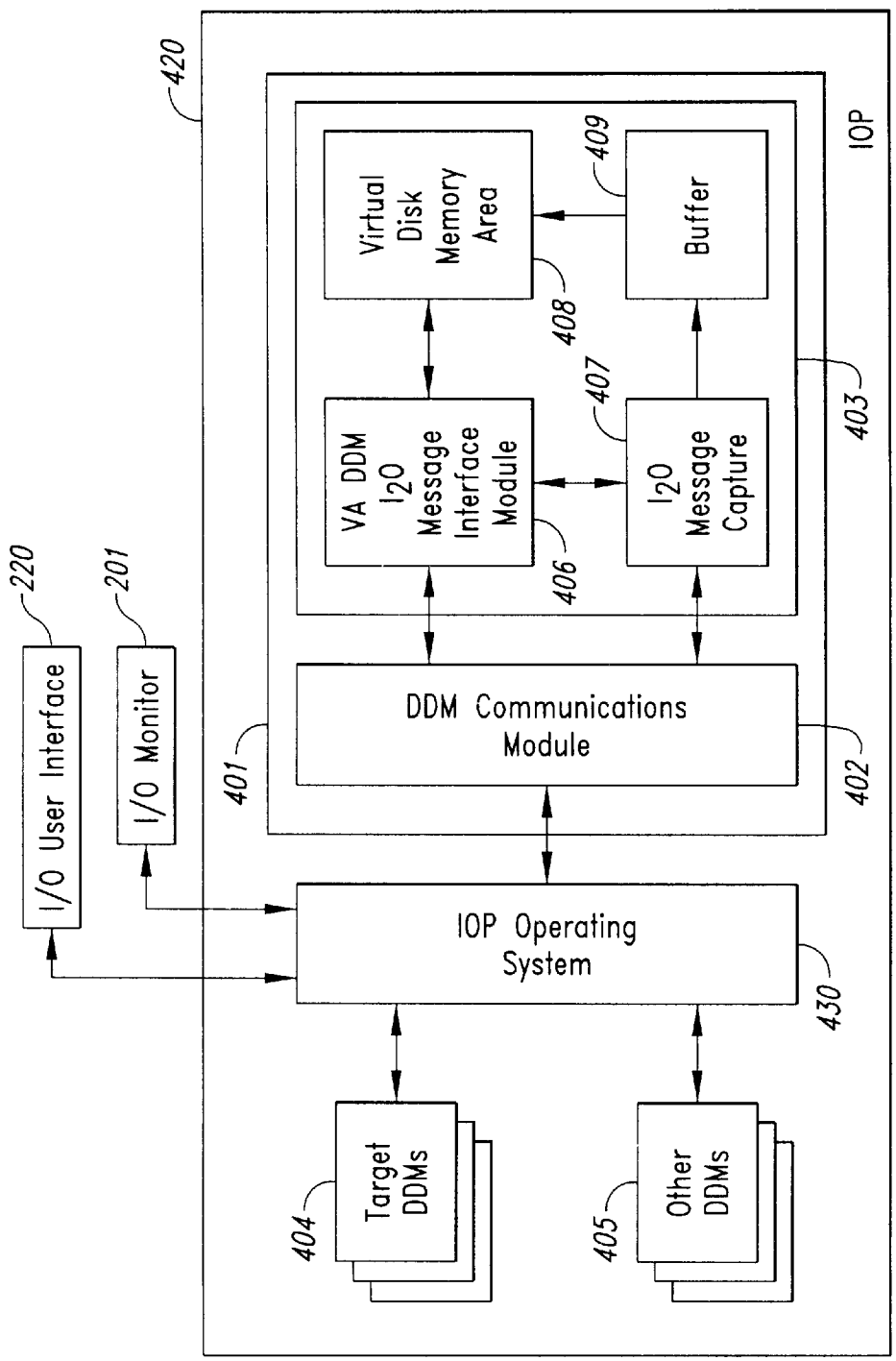
FIG. 4 illustrates the two logical elements comprising a virtual adapter, according to an embodiment of the invention.

While a virtual adapter may comprise a single piece of software, its functionality comprises two logical elements: a first element that communicates with elements such as the $I_2O$ DDM interfaces, the IOP's operating system, the I/O user interface, and the I/O monitor; and a second element, known as the capture module, that monitors, collects and copies actual $I_2O$ message data for later reporting to the I/O user interface and the I/O monitor. FIG. 4 illustrates these two logical elements comprising a virtual adapter, according to an embodiment of the invention. A virtual adapter 401 resides in an IOP 420 having target DDMs 404 and other DDMs 405. The target DDMs 404 represent the set of DDMs whose messages the virtual adapter 401 has presently been instructed to filter. The virtual adapter 401 comprises a DDM communications module 402 and an $I_2O$ message capture module 403. The DDM communications module 402 communicates with the IOP's operating system 430, an I/O user interface 220 and an I/O monitor 201, as well as the communications capture module 403. The communications capture module 403 comprises an $I_2O$ message capture element 407, an $I_2O$ message buffer 409, an $I_2O$ message interface module 406, and a virtual disk memory area 408.

The DDM communications module 402 operates within an operating system $I_2O$ message dispatching task that is dedicated to the virtual adapter only as a DDM, according to an embodiment of the invention. The virtual adapter 401 must return from the I$_2$O message dispatching task's calls synchronously and leave asynchronous operations to its own separate tasks or to the I$_2$O messaging system. The I$_2$O message capturing module 403 operates within the context of the I$_2$O device whose I$_2$O message it is capturing. Accordingly, these two functional parts comprise separate threads that need to communicate and be synchronized with each other as well as being able to share data. A thread comprises a separate process that is part of a larger process or program.

The I$_2$O message capture module 403 directs the DDM communications module 402 to return captured I$_2$O message data to the I/O user interface 220 or the I/O monitor 201 by posting an event to the DDM communications module's event handler. An event represents an action or occurrence to which a program, such as the DDM communications module 402, responds. This task may be performed by an operating system function that specifies an event handler function that responds to the event, such as the standard EventQueuePost( ) function in the IxWorks operating system. IxWorks is an operating system having functionality specifically designed for use in an I$_2$O compliant architecture. The EventQueuePost( ) function has the effect of waking up the DDM communications module 402 at a time when the module is not processing a request I$_2$O message from either the I/O user interface 220 or the I/O monitor 201. The DDM communications module 402 checks its queue of outstanding read requests for an acquired data file, and if any request exists, the DDM communications module 402 uses the request to forward as much data as possible from the virtual adapter's buffer 409. The DDM communications module 402 notifies the capture module 403 that it is waiting for data to fulfill a read request by making a function call to the capture module 403.

The virtual adapter 401 stores some configuration settings in persistent memory, such as the amount of memory used for its buffers. Persistently storing configuration settings allows the information to survive across re-boots of the IOP, the server, and the computing system. Since saving information to persistent storage on an IOP is time-consuming, and since users of the monitoring system may not always wish to retain configuration settings, the virtual adapter saves configuration settings as new default settings in persistent memory only when specifically directed to do so by the I/O user interface 220 or the I/O monitor 201, according to an embodiment of the invention.

If the virtual adapter consumes all of its buffer memory, such as the buffer 409, the virtual adapter 401 will have no memory available for storing new I$_2$O messages. Accordingly, the virtual adapter 401 will not collect new I$_2$O messages until more memory becomes available in the buffer 409. Thus, this situation results in lost I$_2$O messages during the time period intervening between consumption of the last bit of available buffer memory and the freeing up of new memory. However, the virtual adapter 401 may continue to count messages passing through the IOP. In some embodiments, the buffer 409 operates as a ring buffer, discarding messages in their order of receipt.

The virtual adapter 401 also collects I$_2$O message statistical information that may be reported to the I/O user interface 220 or I/O monitor 201 upon request. The virtual adapter 401 collects statistics such as the number of I$_2$O messages seen and captured, the number of I$_2$O messages received and forwarded by the virtual adapter, and the number of I$_2$O messages dropped due to buffer overruns. The virtual adapter 401 may also collect statistics useful for its own debugging and performance evaluation.

Figure 5:
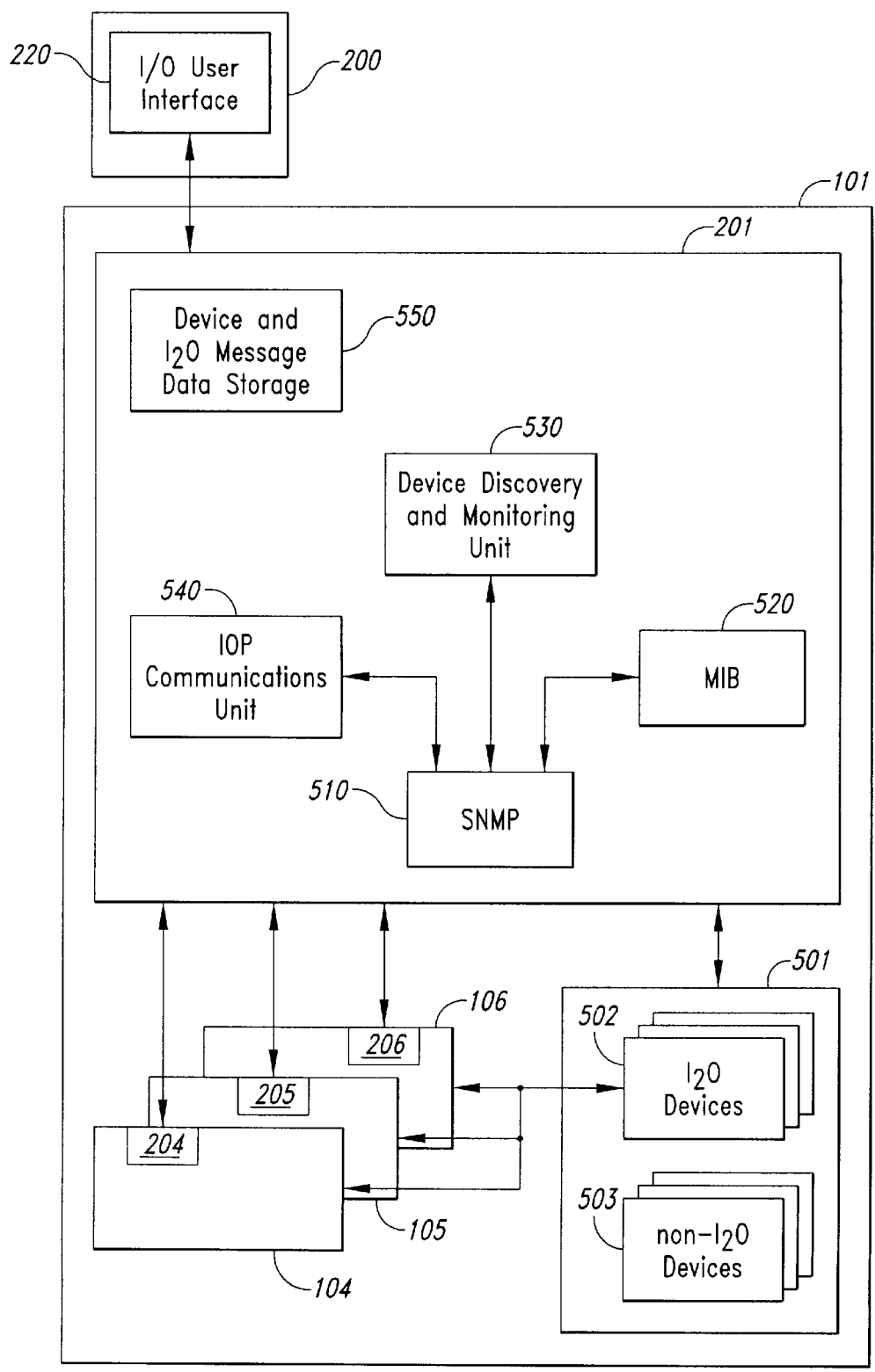
FIG. 5 is a block diagram depicting the I/O monitor 201 shown in FIG. 2 and its interfaces to other elements of the monitoring system, according to an embodiment of the invention.

FIG. 5 is a block diagram depicting the I/O monitor 201 shown in FIG. 2 and its interfaces to other elements of the monitoring system, according to an embodiment of the invention. The I/O monitor interfaces with the I/O user interface 220 running on the workstation 200, the virtual adapters 204–206 and with server devices 501 on the server 101. The I/O monitor 201 interfaces with the server devices 501, including both I$_2$O devices 502 and non-I$_2$O devices 503.

On a server with multiple IOPs, the I$_2$O message traffic for a target DDM does not necessarily pass through a specific IOP. Since each virtual adapter resides on a particular IOP, then no one virtual adapter in a multiple IOP server necessarily receives all of the I$_2$O message traffic for all the I$_2$O DDMs. Accordingly, the monitoring system includes an I/O monitor in the server that identifies and collates the I$_2$O messages captured by the virtual adapters, according to an embodiment of the invention. The I/O monitor 201 includes a device discovery and monitoring unit 530 that performs discovery for both I$_2$O devices and non-I$_2$O devices on the server 101. The I/O monitor 201 collects all run-time statistical data for both I$_2$O devices 502 and non-I$_2$O devices 503, as directed by the I/O user interface 220 running on the workstation 200. The I/O monitor 201 may also turn on and off a virtual adapters on an IOP of its server using an IOP communications unit 540.

The I/O monitor 201 discovers and gathers statistical data on non-I$_2$O local area network ("LAN") devices and block storage devices on its server. In one embodiment of the invention, the I/O monitor's device discovery and monitoring unit 530 performs this task using a Simple Network Management Protocol (an "SNMP") management interface 510. The I/O monitor 201 may use an SNMP management dynamic link library ("DLL") for this purpose and collect data as specified in an SNMP management information base ("MIB") 520. Using the SNMP management interface 510, the I/O monitor 201 may make available to the I/O user interface 220, MIB data for standard, non-I$_2$O LAN and block storage devices located in its respective server.

SNMP utilizes a fetch-store paradigm in which agents maintain in the MIB a set of management information such as statistics, status, and configuration values. The SNMP management interface 510 performs SNMP requests such as those provided by a Java applet. The SNMP management interface 510 contains an SNMP master agent that performs SNMP packet verification and also contains SNMP subagents that perform the actual sending and retrieving of information from the server devices 501 via the IOP communications unit 540. The MIB 520 provides management information for the SNMP management interface 510. The MIB 520 essentially tells the SNMP management interface 510 what pieces of information in the server 101 it can modify or view. Information in the MIB 520 may be modified using three operations: Get, Get-Next, and Set. "Get" allows the SNMP management interface 510 to retrieve the value of an object in the MIB 520. "Get-Next" allows the SNMP management interface 510 to retrieve the value of the next object instance in the MIB 520 without necessarily knowing the name of the object. "Set" allows the SNMP management interface 510 to change the value of one or more objects in the MIB 520. The "Set," "Get" and "Get-Next" requests may be initiated by command from the 110 user interface 220 and produce an SNMP packet that is ultimately delivered to the 110 user interface 220.

SNMP also provides traps, or an unacknowledged message, sent asynchronously to the SNMP management interface 510 that indicate an exception condition. SNMP traps allow the SNMP management interface 510 to discover anomalous situations that might require intervention. SNMP primarily uses polling to gather information about monitored elements which produces traps that alert the SNMP management interface 510 that additional polling is necessary. The 110 monitor 201 does not need to utilize the SNMP trap interface in order to report events to the I/O user interface 220. The I/O user interface 220 regularly polls all I/O monitors and can easily detect exceptional conditions. However, flagging events using the standard SNMP trap interface has the advantage of not only making events accessible to third party management software but of also reducing the latency in reporting such events to the I/O user interface 220.

The I/O monitor 201 may transfer quantifies of statistical data to the I/O user interface 220 through remote procedure calls ("RPCs"), shared files, SNMP, pipes, or sockets, as well as other interfaces. The I/O monitor stores the data regarding its server in a device and $I_2O$ message and data storage unit 550. An RPC is a call by one program to a second program on a remote system, such as by the I/O user interface 220 to the I/O monitor 201. The second program generally performs a task and returns the results of that task to the first program. Shared files represent files in memory that may be both written to and read from by multiple programs. A pipe is a portion of memory that can be used by one process to pass information to another. Essentially, a pipe operates like its namesake, connecting two processes so that the output of one may be used as input to the other. A socket is an identifier for a particular service on a particular node on a network. A socket consists of a node address and a port number which identifies the service. The most generally efficient methods in terms of network overhead and development time are preferred and should be selected according to the specific elements comprising the computing system into which the $I_2O$ monitoring system is installed.

The device and $I_2O$ message and data storage unit 550 retains historical statistical data for all monitored devices on its server, including both the $I_2O$ devices 502 and the non-$I_2O$ devices 503, as well as an data retrieved from a virtual adapter on the server 101. The I/O monitor 201 passes these statistics as requested by the I/O user interface 220 using a programmatic interface and a specific data record format. In addition to passing statistical data, the I/O monitor 201 also maintains an interface for passing and receiving control and configuration information and commands to and from the I/O user interface 220. For example, the I/O user interface 220 may instruct the I/O monitor 201 to monitor only $I_2O$ devices.

The I/O user interface 220 may install the I/O monitor 201 on the server 101, according to an embodiment of the invention. The I/O user interface 220 may install the I/O monitor 201 as an operating system service utility, according to yet another embodiment of the invention. For example, when the server 101 is added to the computing system, the I/O user interface 220 installs an instance of the I/O monitor 201 on the server 101. Following installation of the I/O monitor 201, the I/O user interface 220 then discovers the server 101 and the I/O monitor 220 in order to establish communications.

Once the I/O user interface 220 has specified and enabled alarm and/or warning events for a particular device on a given server, the I/O monitor on the device's server periodically monitors the device's statistical records for occurrences of the specified event. Once engaged, this monitoring continues regardless of whether the I/O user interface 220 continues running itself or whether it continues displaying information related to the specified device or its server. The I/O monitor 201 receives initial and new event configuration information for its monitored devices from the I/O user interface 220. The I/O monitor 201 stores these event settings persistently across reboots of its server. The I/O monitor 201 keeps track of the events that have occurred on its server's devices. When the I/O user interface 220 queries the I/O monitor 201, the I/O monitor 201 apprises the I/O user interface 220 of all the events that have occurred for the monitored devices since the previous query.

The I/O monitor 201 maintains a persistent log file of the events that have occurred on its server. The event log comprises: event type (device, IOP, statistic-type, threshold, alarm or warning); event start time; event stop time (if applicable); event reset time (when cleared by I/O user interface, if applicable), and event duration (if applicable). The log file may be either text or binary, although text is preferred. Text allows users to save and easily read the log of events for a given server. A binary file consumes less disk space and is easier to pass to the I/O user interface 220 across the computing system.

The I/O user interface 220 provides its users with a list of the $I_2O$ devices and the non-$I_2O$ devices that have been detected by the virtual adapters and I/O monitors in the computing system. This list allows the user to attach "alias" strings to detected $I_2O$ devices and non-$I_2O$ devices for ease of identification. An alias is an assumed name for a computing object, such as a device name, the name of which may be easier for a user to utilize than the computing object's complete name. An alias name points to the object's actual name, and the I/O user interface 220 remembers the alias names from one invocation to the next.

The I/O user interface 220 provides a graphical user interface ("GUI") having a window that displays captured and timestamped $I_2O$ messages retrieved by a specific virtual adapter or an I/O monitor. The I/O user interface 220 allows the user, such as an $I_2O$ product developer, to disable the further capturing of $I_2O$ messages from specific $I_2O$ devices. When a virtual adapter monitors more than one $I_2O$ device's DDM in an IOP, the $I_2O$ messages from the $I_2O$ devices may be displayed either chronologically or by $I_2O$ device. The I/O user interface's GUI may display $I_2O$ message time stamps using a relative time, e.g., minutes, seconds, or microseconds from the previous $I_2O$ message. The user determines whether the GUI message display scrolls automatically as new $I_2O$ messages appear or if the display scrolling is under manual control. The user may further direct the I/O user interface 220 to display $I_2O$ messages from different $I_2O$ devices in different formats on the GUI. The I/O user interface and the virtual adapters may be further configured to not display $I_2O$ messages associated with particular $I_2O$ devices.

Figure 6A:
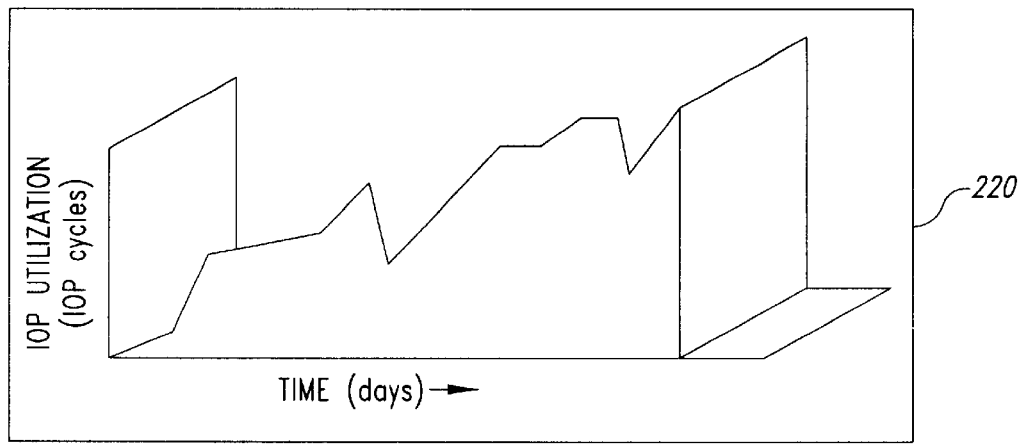
FIGS. 6A–6C illustrate exemplary displays of $I_2O$ message streams that may be provided to a user by the I/O user interface.
Figure 6B:
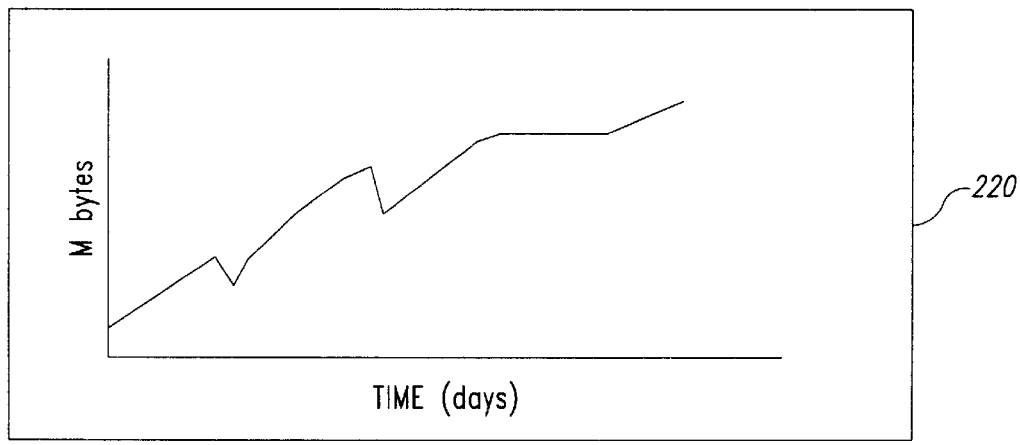
Figure 6C:
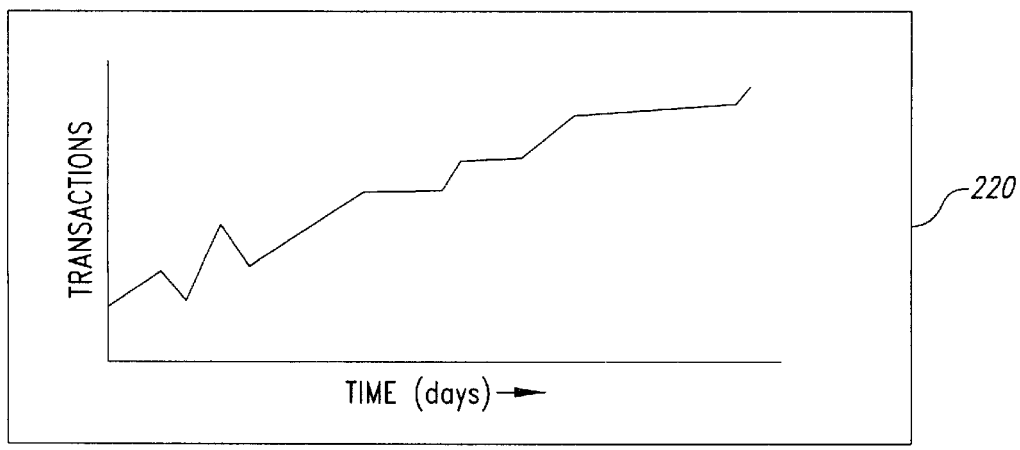

As shown in FIGS. 6A–6C, the I/O user interface may display summarized $I_2O$ message streams that obscure the details of individual $I_2O$ messages. Displaying collections of $I_2O$ messages provides the user with a clearer view of the $I_2O$ systems than merely displaying a series of individual messages. From these settings, the user may also retrieve a more detailed description of a particular $I_2O$ message and its contents. The I/O user interface also provides a variety of $I_2O$ message filtering options to a user, as will be discussed further below.

FIG. 6A depicts an I/O user interface generated three-dimensional plot showing a computing system's IOP utilization growth over time. FIG. 6B is an I/O user interface generated chart depicting cumulative I$_2$O message growth in megabytes on a computing system over time. FIG. 6C is an I/O user interface generated chart showing the cumulative I$_2$O transactions in a computing system over time. The I/O user interface may also include an integrated or stand-alone utility that presents I$_2$O message data streams, both in real time and from a file, as graphical histogram representations.

The I/O user interface stores I$_2$O message data in its application memory. The I/O user interface may use its application memory as a circular buffer, retaining as much of the data as possible, until its I$_2$O message data is deleted or saved in persistent memory. The I/O user interface also provides settings that allow a user to save I$_2$O message data to a disk file. These settings allow large volumes of captured data to be retained for later analysis, irrespective of the I/O user interface's memory limitations. When the user directs that I$_2$O message data be stored to a file, the I/O user interface stores all the I$_2$O message data it possesses, regardless of the present I$_2$O message filtering state or display characteristics. Saving all the I$_2$O message data allows the user to analyze the entire set of received data. The I/O user interface may also receive I$_2$O message data from a disk file. Reloaded I$_2$O message data may be displayed with the original date and time associated with its initial receipt.

Figure 7:
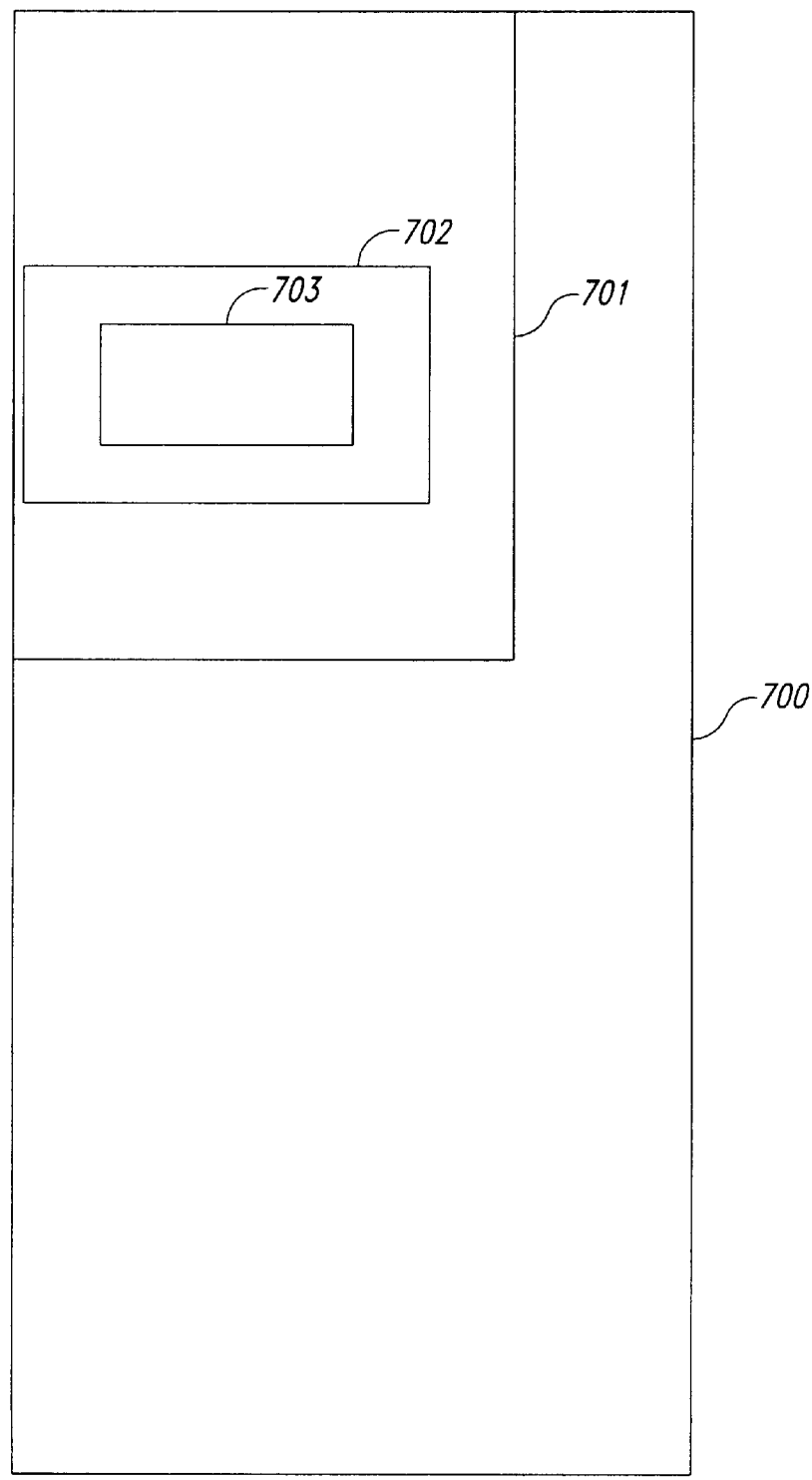
FIG. 7 illustrates three levels of $I_2O$ message filtering in an exemplary $I_2O$ communications monitoring system.

The I$_2$O communications monitoring system provides three levels of an I$_2$O message filtering, as shown in FIG. 7. Each of the applied I$_2$O message filters shapes the display provided to a user at the I/O user interface. Block 700 represents all of the I$_2$O messages flowing through a representative IOP to which I$_2$O message filters 701–703 have been applied.

At the lowest filtering level (the filter 701), the I/O user interface or I/O monitor instructs the virtual adapter to capture only certain I$_2$O messages; e.g., the I$_2$O messages associated with a particular I$_2$O DDM. In this example, the virtual adapter only captures the I$_2$O messages within the filter 701 and ignores the I$_2$O other messages in the block 700. The most common format for the filter 701 involves capturing only I$_2$O messages for selected I$_2$O devices on the IOP and not capturing I$_2$O messages for other I$_2$O devices. The filter 701 may also direct the virtual adapter to filter I$_2$O messages by I$_2$O message type. As discussed above, the I/O user interface and I/O monitor may also filter I$_2$O messages by type. Providing the virtual adapter with the same functionality serves to limit the quantity of I$_2$O messages passed through the monitoring system. The I/O user interface allows the user to specify whether the filter 701 should be applied at the virtual adapter level, the I/O monitor level, or at the I/O user interface level. The I/O user interface includes user assistance functionality that explains to the user the meaning and possible consequences of the filtering choices.

At the intermediate level (the filter 702), the I/O user interface allows the user to specify filters that restrict the I/O user interface's display to I$_2$O messages of particular types only. The filter 702 applies only to I$_2$O messages that have already been passed to the I/O user interface from the virtual adapter and I/O monitor. The filter 702 effects only the I/O user interface's present filtering and has no effect on the I$_2$O messages themselves or prevents the I$_2$O messages from later being filtered according to different criteria. For example, the filter 702 allows I$_2$O messages to be filtered according to I$_2$O message type and other I$_2$O message fields. The filter 702 may also instruct the I/O user interface to filter I$_2$O messages based upon combinations of I$_2$O message fields. In addition, I$_2$O messages may be filtered according to the "request status" field in all I$_2$O messages, allowing the user to view only I/O error I$_2$O messages, for example.

At the highest level (the filter 703), the I/O user interface allows the user to select a format for the screen display. The filter 703 allows a user to view a desired subset of I$_2$O message fields. The user may select the I$_2$O message types from which the I$_2$O devices will be displayed, and the user may customize the I$_2$O message display to include only those I$_2$O message fields of interest. Of course, the filter 703 only affects I$_2$O message display and does not involve the actual deletion of any I$_2$O messages or information contained in I$_2$O messages.

The I/O user interface retains the user's selections for the filters 701–703 and uses the last filtering selections as the initialization settings for its next reboot. The I/O user interface's ability to retain filter settings may be linked in tandem with the virtual adapter's ability to store new default settings in non-volatile IOP storage, according to an embodiment of the invention.

The I/O user interface also allows the user to control the amount of IOP board memory used by the virtual adapter in the I$_2$O message capture process. The virtual adapter has a default size for its I$_2$O message buffer, e.g., 16 kilobytes. The I/O user interface allows a user to decrease the default value to provide more memory for other IOP drivers or to increase the default value to avoid a buffer overrun. Buffer size changes provided by the I/O user interface take effect immediately in the virtual adapter and may result in the loss of some I$_2$O message data in the buffer when the buffer size decreases. In addition, the I/O user interface may instruct the virtual adapter to continue using the new buffer size settings (as well as other configuration changes) in a future sessions.

The interface between the I/O user interface and the virtual adapter DDM communications module may be established through standard operating system file read and write system calls made from the I/O user interface to the virtual adapter's virtual disk drive; e.g., virtual random access memory ("RAM") disk drive. During initialization, the virtual adapter's virtual RAM disk drive will be formatted to contain five "virtual" files having predefined names. The I/O user interface and I/O monitor may open the files and perform reads and writes to them. These file I/O requests are eventually received by the virtual adapter's DDM communications module. Writes to the files pass control information to the virtual adapter, while the virtual adapter uses reads from the files to pass captured I$_2$O message data as well as virtual adapter status and configuration information up to the I/O user interface and I/O monitor. The virtual files do not necessarily behave in the same manner as a real file. For example, reading the same virtual file location multiple times may result in different data each time, and reading a virtual file location that has just been written to may also not result in the same data.

Since the virtual adapter has the appearance of a block device, all requests processed by the virtual adapter are in multiples of the device block size, e.g., 512 bytes. The device block size represents the minimum block size that is typically processed (or allowed) by device file systems. Accordingly, the I/O user interface sends requests to the virtual adapter in multiples of 512 bytes. While the virtual adapter normally returns bit status having an "actual" size equal to the requested size, the virtual adapter may actually access only a portion of the memory required for a necessary subset of the block size. This approach reduces the overhead associated with memory access transfers.

As previously discussed, the virtual adapter initializes itself so as to appear as a virtual disk to the other elements of the computing system. For example, the virtual adapter may appear to be a DOS FAT file system. The well-known MS-DOS operating system uses the DOS FAT file system to organize and manage files. The FAT (or "file allocation table") is a data structure that MS-DOS creates on a disk when the disk is formatted. When MS-DOS stores a file on a formatted disk, the operating system places information about the stored file in the FAT so that MS-DOS can retrieve the file later when requested.

The I/O user interface does not need to know the logical location of the virtual adapter's virtual files. Accordingly, the virtual files may appear at any logical disk location and in any order on the virtual adapter's virtual disk. The I/O user interface merely needs to know the names of the virtual files, provided below, and the methods required to access them properly. The I/O user interface initiates the passing of control information to the virtual files. After opening a virtual file, the I/O user interface typically reads and writes to the beginning of the file, resetting the file pointer accordingly.

The virtual adapter's virtual disk contains five virtual files, according to an embodiment of the invention. These files provide a functional interface between the virtual adapter and the I/O user interface and I/O monitor. The five virtual file names used and their respective functions are:

| | |
|---|---|
| ACQUIRED.DAT | Read acquired $I_2O$ message data. |
| STATUS.DAT | Read and write virtual adapter status, write control commands, read statistics. |
| EVENTS.DAT | Write $I_2O$ message filtering criteria. |
| SYSTEMS.DAT | Read IOP system information. |
| TARGET.DAT | Read device information for a specific IOP target ID. |

Figure 8:
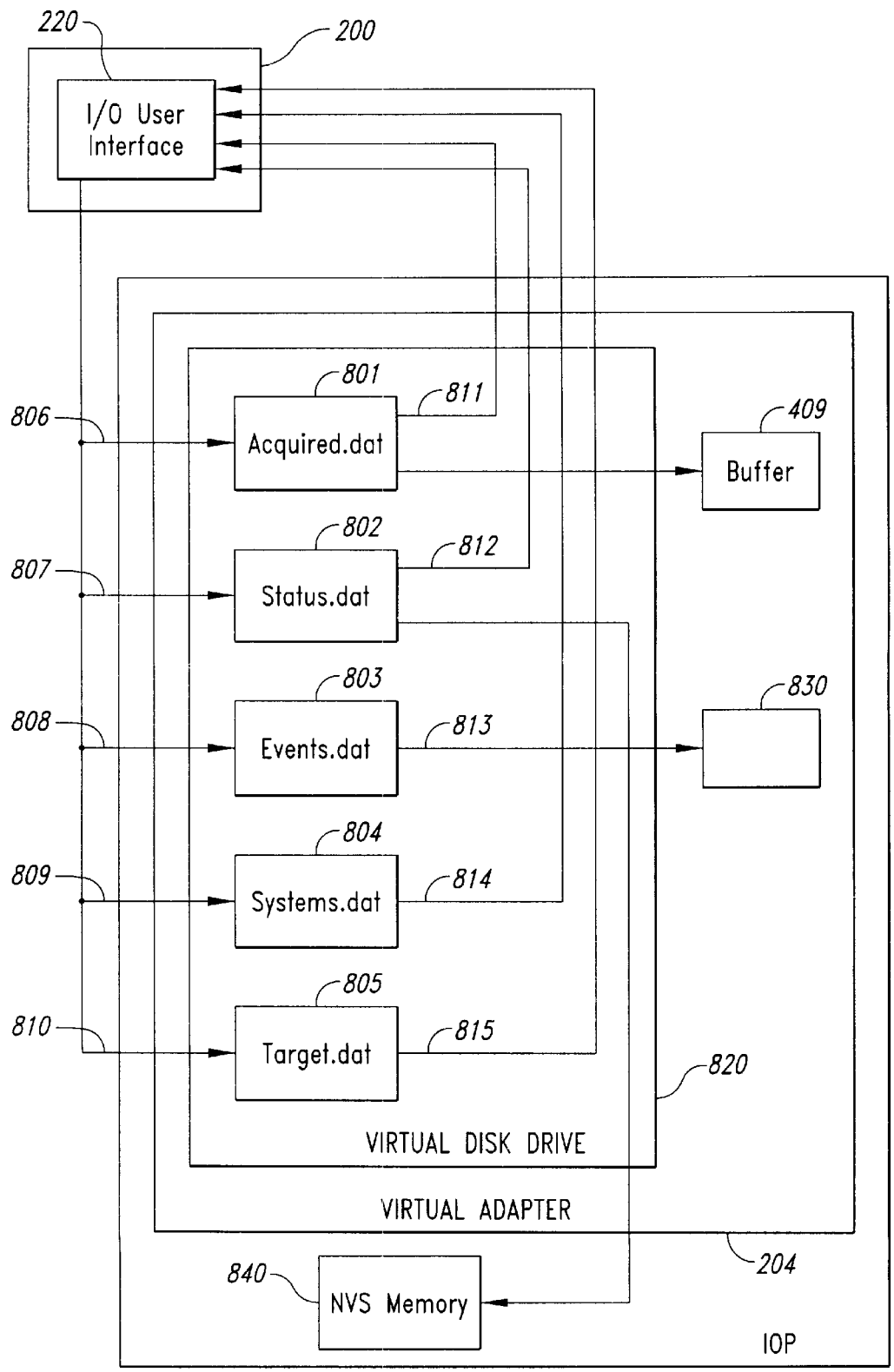
FIG. 8 illustrates an I/O user interface performing various reads and writes to a virtual disk drive on the virtual adapter, according to an embodiment of the invention.

FIG. 8 illustrates the I/O user interface 220 performing various reads and writes to a virtual disk drive 408 on the virtual adapter 204, according to an embodiment of the invention. The I/O user interface 220 sends a read command to an ACQUIRED.DAT virtual file 801 to prompt the virtual adapter 204 to send $I_2O$ message data back to the I/O user interface 220. The I/O user interface 220 sends read commands to a STATUS.DAT virtual file 802. In response the virtual adapter 204 provides the I/O user interface 220 with statistical information regarding the virtual adapter 204. Writes to the STATUS.DAT virtual file by the I/O user interface 220 instruct the virtual adapter 204 to update its control commands in system status area 840. The I/O user interface 220 may send a write command to an EVENTS-.DAT virtual file 803 that prompts the virtual adapter 204 to write new filtering information into a filter 830. The I/O user interface 220 sends read commands to a SYSTEMS.DAT virtual file 804 to prompt the virtual adapter 204 to forward to the I/O user interface 220 systems status information regarding the virtual adapter's IOP. The I/O user interface 220 may send a read command to a TARGET.DAT virtual file 805 that prompts the virtual adapter 204 to send the I/O user interface 220 device information for a specific IOP device target ID ("TID").

The virtual adapter 204 collects captured $I_2O$ messages in a buffer, such as the ring buffer 509 shown in FIG. 5. A byte count and time stamp inserted by the virtual adapter precedes each $I_2O$ message stored in the buffer. Table One provides an exemplary format in pseudocode for the captured $I_2O$ messages.

TABLE ONE

```
typedef struct captureRecord {
    U32                  byteCount:       /* Number of bytes of message data. */
    U32                  timestampLow:
    U32                  timestampHigh:
    I2O_MESSAGE_FRAME    messageFrame:    /* Irreducible minimum to capture */
                                          /* Message "payload" follows */
} CAPTURE_RECORD:
```

The byte count ("byteCount") shown in Table One indicates the actual size of the $I_2O$ device's message fields. The I/O user interface may instruct the virtual adapter regarding an upper limit for the number of bytes passed to the I/O user interface per $I_2O$ message. When an $I_2O$ message exceeds the upper limit, the virtual adapter truncates the $I_2O$ message and reports the actual size of the complete $I_2O$ message to the I/O user interface. When an $I_2O$ message is lower than the limit, the virtual adapter copies the $I_2O$ message's exact size and reports its true size, which should also coincide with the $I_2O$ message length contained in the $I_2O$ message itself.

The I/O user interface requests the virtual adapter's acquired $I_2O$ message data by opening and reading from the ACQUIRED.DAT file 801 on the virtual adapter's virtual disk. The ACQUIRED.DAT file 801 may appear to have a particular length, such as 496 bytes. However, a request to read the ACQUIRED.DAT file 801 from any starting location within the file results in the same action: the transfer of $I_2O$ message data beginning with the oldest $I_2O$ message data in the virtual adapter's buffer. Nevertheless, the I/O user interface 220 normally only reads from the beginning of the ACQUIRED.DAT file 801. The I/O user interface may make read requests of any integral block size (up to the ACQUIRED.DAT file size), and the block size places an upper limit on the amount of data that is returned for the read request.

The I/O user interface 220 will frequently send read requests to the ACQUIRED.DAT file 801. In fact, in a typical operational mode, the I/O user interface 220 will almost always have an outstanding read request to the virtual adapter 204. To reduce the $I_2O$ message traffic in the computing system, the virtual adapter will not respond to a read request (regardless of its size) until the virtual adapter 204 has accumulated a volume of $I_2O$ message data (in bytes) equal to or greater than the threshold volume specified by the I/O user interface 220 or upon the passage of a pre-configured time period, e.g., the oldest $I_2O$ message in the buffer 409 having surpassed the pre-configured time period.

When the virtual adapter's buffer contains insufficient data upon the arrival of an $I_2O$ message request from the I/O user interface, the virtual adapter queues the request in an internal queue for later use. Once the buffer 409 has acquired the threshold volume of $I_2O$ message data, the virtual adapter 204 retrieves the last read request for ACQUIRED- .DAT file 801 sent by the I/O user interface (or waits for the next request) and satisfies the request by returning the amount of I₂O message data specified in the read request.

The virtual adapter 204 immediately returns to the I/O user interface 220 any I₂O message data stored in the buffer 409 longer than the specified data time-out period (without the threshold volume having been reached) using the first outstanding read request for the ACQUIRED.DAT file 801. If there is no outstanding read request, the virtual adapter 204 returns the i₂O message data upon receipt of the next read request. In this case, the virtual adapter 204 returns all the data in the buffer 409, up to the size of the read request.

The I/O user interface's read requests should always be equal to or greater than the specified threshold volume, although the procedure will still work properly when a read request is smaller. If the last byte of a read request occurs in the middle of an acquired capture record, the virtual adapter 204 simply breaks the record across two transfers, and the I/O user interface 220 reassembles the broken record upon receipt.

The virtual adapter 204 may perform the actual data transfer by calling operating system functions that perform a direct memory access ("DMA") from the virtual adapter's memory to the I/O user interface's memory. DMA provides a fast method for moving data from a storage device or LAN interface card directly to a random access memory ("RAM") which speeds processing. In essence, DMA provides direct access to memory by a peripheral device that bypasses the server's CPU. When the DMA operation completes, the operating system notifies the virtual adapter's DDM communications module and then sends a reply I₂O message to the I/O user interface 220. The brief reply I₂O message is usually created by reusing the original I₂O message read request. Once this step has been performed, the virtual adapter 204 marks the buffer 409 so that it may now be reused for new data.

Another virtual file, the STATUS.DAT file 802, facilitates updates to and retrievals of the virtual adapter's configuration and status settings. The configuration and status settings include the virtual adapter's operational settings and buffer sizes, the writing of "command registers," and the reading of runtime statistics on the virtual adapter. Additional types of configuration information may be passed using the three remaining virtual files to be discussed below.

The STATUS.DAT file 802 comprises one data block (512 bytes) containing the types of information previously discussed. Because this information does not actually require the entire 512 bytes of the device block size, the virtual adapter 204 copies only the required amount of data to the I/O user interface 220 during the DMA procedure.

The virtual data in the STATUS.DAT file 802 utilizes the status capture data structure discussed below in Table Two. The capture status data structure is functionally grouped into four parts. The capture status data structure's first part includes the virtual adapter's operational settings, which may be both read and written by the I/O user interface 220 and the I/O monitor 201. The capture status data structure's second part comprises control fields (or registers) that cause the virtual adapter 204 to perform certain specified actions when they contain a non-zero value. The control fields in the capture status data structure generally appear as write only fields. The capture status data structure's third and fourth parts include informational and statistical fields that the I/O user interface 220 reads to retrieve run-time information about the virtual adapter 204. The information and statistical fields may be established as read only, as shown in Table Two.

TABLE TWO

```
typedef struct captureStatus {
    /* Operational settings */
    U32 captureRingSize:        /* RW: current ring buffer total size. */
    U32 captureSize:            /* RW: max # bytes to capture per message */
    U32 threshold:              /* RW: read data threshold. */
    U32 dataTimeout:            /* RW: read data timeout in microseconds. */
    U32 captureActive:          /* RW: Master ON/OFF switch for capture */
    U32 captureOnBoot:          /* RW: Enable/disable capture on next startup */
    /* Control fields */
    U32 clearAcquisition:       /* WO: non-zero to clear the acquisition buff */
    U32 flushReads:             /* WO: non-zero to return all pending reads. */
    U32 disableTarget:          /* WO: 0-4095 is target ID to disable capture */
    U32 enableTarget:           /* WO: 0-4095 is target ID to enable capture */
    U32 resetStatistics:        /* WO: non-zero to zero all statistics. */
    U32 writeConfigNVS:         /* WO: non-zero to save settings as defaults */
    U32 nextTargetInfo:         /* RW: next TID to read info from TARGET.DAT */
    /* Informational fields */
    U32 timestampLow:           /* RO: current timestamp value, low. */
    U32 timestampHigh:          /* RO: current timestamp value; high. */
    U32 timestampFreq:          /* RO: IOP timestamp frequency in Hertz. */
    U32 captureByteCount:       /* RO: current ring buffer valid data bytes */
    U32 hdmTid:                 /* RO: VA's capture HDM target ID. */
    U32 ddmTid:                 /* RO: VA's DDM Target ID. */
    /* Statistics */
    U32 captureTotalMessages:   /* RO: Total # of messages seen */
    U32 captureAcquiredMessages: /* RO: Total # of messages acquired */
    U32 captureMissedMessages:  /* RO: Total # of messages dropped */
    U32 vaRequests;             /* RO: # request messages received by VA. */
    U32 vaReplies;              /* RO: # reply messages sent by VA.*/
} CAPTURE_STATUS;
```

The STATUS.DAT file 802 comprises only virtual data. The virtual adapter 204 maintains separate "master" copies of its actual configuration settings. When the virtual adapter 204 receives a read or write request for the STATUS.DAT file 802, the virtual adapter 204 causes the data transfer to occur either to or from a "scratch" area and reports or retrieves only those fields that are pertinent to the requested operation. For example, it makes little sense to save the "current" value of the read-only control fields or to modify the read-only control fields due to a write operation.

The configuration values for "captureRingSize," "captureSize," "threshold," "dataTimeout," (all shown in Table Two) may be saved to a non-volatile storage ("NVS") memory 840, although this is not necessarily the case for other configuration values. The "captureOnBoot" setting over-rides the "captureActive" setting, allowing the I/O user interface 220 to modify "captureActive" during data collection without the need for verifying that "captureActive" always ends up reflecting the desired "captureOnBoot" setting. Saving the present filtering state to the NVS memory 840 may be performed in some embodiments of the invention, although this approach is not a preferred one.

The virtual adapter 204 normally initializes itself in a quiet state, performing no $I_2O$ message capture until requested to do so by the I/O user interface 220 or the I/O monitor 201, as previously discussed. When the "captureOnBoot" field (shown in Table Two) has been activated, the I/O user interface 220 instructs the virtual adapter 204 to act as a "boot monitor" by capturing all received $I_2O$ messages upon the next initialization of the virtual adapter 204. The virtual adapter 204 stops collecting new data when the buffer 409 becomes full. When this happens, the virtual adapter 204 retains its acquired $I_2O$ messages until requested to report them to the I/O user interface 220 or the I/O monitor 201. The "captureOnBoot" setting only takes effect when it is followed by a "WriteConfigNVS" command which stores the setting in the NVS memory 840. When this occurs, then "captureOnBoot" takes effect during the next IOP reboot and remains in effect until the I/O user interface 220 resets this field by an explicit write to the "captureOnBoot" status field followed by another invocation of the WriteConfigNVS command.

The virtual adapter 204 may access the NVS memory 840 on the IOP where the virtual adapter may store configuration data and other information across re-boots of the IOP. Since an IOP does not typically have a specific "shutdown notification" mechanism, the virtual adapter 204 cannot wait until the IOP shuts down to store this data. Moreover, writing to the NVS memory 840 typically involves a time-consuming write to flash ROM memory, for example, which the virtual adapter 204 should not perform each time the STATUS.DAT file 802 changes. Accordingly, the virtual adapter 204 only writes configuration settings to the NVS memory 840 when the virtual adapter 204 has been explicitly instructed to do so by the I/O user interface 220 through the writing of a non-zero value to the "WriteConfigNVS" field (shown in Table Two). When the "WriteConfigNVS" command has not been received, then the next time the IOP restarts, the virtual adapter 204 initializes itself with the same configuration values used during its last reboot. The virtual adapter 204 uses its current configuration settings, as last modified by the I/O user interface 220, so long as the IOP remains running, regardless of how many times the I/O user interface 220 itself has been unloaded and re-invoked. The I/O user interface 220 has the responsibility for first reading the current virtual adapter settings and then modifying them for contemporary purposes, as needed.

The "disableTarget" and "enableTarget" fields (shown in Table Two) allow the I/O user interface 230 to turn capture "on" and "off" for one IOP target ID ("TID") at a time, without affecting other $I_2O$ message filtering settings. These fields provide an alternative to using the EVENTS.DAT virtual file 803 discussed below. The I/O user interface 220 does not need to write the entire filtering structure in the EVENTS.DAT file 803 in order to disable or enable $I_2O$ message capture on a device-specific basis. A disadvantage of this approach is that it requires one status write operation per TID in order to enable or disable a given TID. "HDMTid" (shown in Table Two) is the TID for the virtual adapter's logical RAM disk device. "DDMTid" (shown in Table Two) is the TID of the virtual adapter's underlying DDM and is not normally accessed by the I/O user interface 220.

The I/O user interface 220 sends $I_2O$ message and device filtering settings to the virtual adapter 204 by writing to the EVENTS.DAT file 803 on the virtual adapter's virtual disk drive. Writing to the EVENTS.DAT file 803 typically occurs in response to user input at the I/O user interface 220. In one embodiment of the invention, the virtual size of the EVENTS.DAT file 803 is 8,704 bytes (17 blocks). Unlike some of the virtual adapter's other virtual files, the layout of the EVENTS.DAT 803 file is consistent with a real file, and the I/O user interface 220 may even write specific blocks of information (512 bytes) into the middle of the EVENTS.DAT file 803 if necessary. The I/O user interface 220 may read some or all of the EVENTS.DAT file 803 at any time as well as view the last information written there.

The ability to filter $I_2O$ messages constitutes a key component of the $I_2O$ monitoring system. The I/O user interface 220 or the I/O monitor 201 may instruct the virtual adapter 204 to filter $I_2O$ messages based on a TID (on the IOP), the initiator ID, the $I_2O$ message function, and the $I_2O$ message flags field, for example. The EVENTS.DAT file 803 utilizes the format provided below in Table Three and typically consists of a single captureEventsArray structure.

TABLE THREE

```
typedef struct captureEventArrays {
    U8    targetId[4096];
    U8    initiatorId[4096];
    U8    function[256];
    U8    flags[256];
} CAPTURE_EVENT_ARRAYS;
```

Each of the four arrays shown in Table Three comprises an 8-bit element for every possible value of the $I_2O$ message field (12-bit fields have 4,096 possible values). Each such 8-bit element defines the filtering state for an $I_2O$ message field by providing values for the field's elements. The bits are defined as follows:

Bit 0=1 Do not capture $I_2O$ messages when the $I_2O$ message field is set to this value.

Bit 4=1 Capture $I_2O$ messages when the $I_2O$ message field is set to this value.

Filtering on the targetID ("TID") field (shown in Table Three) allows the I/O user interface 230 to turn on or off the filtering of particular $I_2O$ devices at the same time the I/O user interface 230 specifies more detailed $I_2O$ message filtering using the other arrays shown in Table Three. The I/O user interface 230 may also explicitly turn on $I_2O$ device-level filtering by writing to the "enableTarget" and "disableTarget" fields of the STATUS.DAT file 802. For example, setting or clearing bit 7 in the targetID array in the captureEventsArray structure may implement the enableTarget and disableTarget functionality shown in Table Two.

The I/O user interface 220 retrieves information from the virtual adapter about the IOP itself by reading the SYSTEM.DAT file 804 on the virtual adapter's virtual disk drive. The SYSTEM.DAT file 804 contains information regarding the IOP, such as the IOP's CPU type, CPU speed, system memory size, system capabilities flags (non-volatile storage, flash RAM, and static RAM), operating system type and version, and manufacturer information. The I/O user interface 220 typically retrieves information only once each time it reboots and requires only a single read of the SYSTEM.DAT file 804.

The I/O user interface 220 retrieves information from the virtual adapter 204 about individual devices on the IOP by reading the TARGET.DAT file 805 on the virtual adapter's virtual disk drive. The I/O user interface 220 typically performs this read once during each active period, although the I/O user interface 220 may perform a number of reads on this file. A single read of the TARGET.DAT file 805 returns device information about only one TID on the IOP.

The TID of the target device in a device information read is retrieved and stored in the STATUS.DAT file 802 in the field "nextTargetInfo" (shown in Table Two). The I/O user interface 220 does not normally know anything about the TID numbers present on the IOP. Thus, the I/O user interface 220 may not generally request information about specific TIDs. However, the I/O user interface 220 may request that the virtual adapter 204 begin reading from the first TID of which the virtual adapter 204 is aware by writing the value "target_Info_Tid" (Table Two) into the "TargetInfo" field (Table Three). Reading the TARGET.DAT file 805 returns device information about the first TID in the form of a TargetInfo structure, such as the structure shown below in Table Four. Subsequent reads of the TARGET.DAT file 805 may return device information about the next TID in the specified IOP until information has been retrieved about all TIDs. Information retrieved about TIDs may not necessarily reported in numerical TID order. The I/O user interface 220 does not necessarily need to write the "nextTargetInfo" field (Table Three) more than once when using this method.

Once the virtual adapter 204 has reported information about all of the TIDs, then subsequent TARGET.DAT file 805 read requests return the TargetInfo data structure having a TID value set to a constant value of "target_Info_Tid," indicating to the I/O user interface 220 that no more TIDs remain to be reported upon for this IOP. The I/O user interface 220 may over-ride this default procedure by writing any TID value for which it wishes to receive status information into the status file's "nextTargetInfo" field (Table Two) before reading the TARGET.DAT file 805. If a provided TID is invalid for a given IOP, the virtual adapter 204 returns the TargetInfo structure with its "targetID" value set to the constant value "Target_Info_Tid_one."

TABLE FOUR

```
typedef struct targetInfo {
    U32 targetId;         /* Target ID of this device (0 .. 4096). */
                          /* –1 (0xFFFFFFFF) if no such target. */
    U32 nameOffset;       /* offset in bytes to target name string, */
                          /* from start of this structure. */
    U32 devClass;         /* device class. */
    U32 devVersion;       /* device version. */
    U32 devOrganization;  /* organization ID. */
    U32 devSubClass;      /* device subclass. */
    U32 userId;           /* Target ID of device using this device. */
    U32 parentId;         /* Target ID of parent device. */
} TARGET_INFO;
```

Every IOP may have numerous TIDs, many of which the I/O user interface 220 may have no interest in. For example, the first TID reported will often be associated with the IOP's operating system and is of little interest to the I/O user interface 230. In addition, every IOP device driver has its own TID, in addition to TIDs for each logical drive controlled by that IOP device driver. Normally, the I/O user interface 220 will only be interested in the logical devices and not interested in the device driver TIDs. On the other hand, if an end user is interested in examining $I_2O$ messages sent and received by a particular $I_2O$ device driver then these may examined as well. In order to distinguish the device drivers from the logical devices, the I/O user interface 220 only needs to check the "devClass" field of the TargetInfo structure shown in Table 4.

Figure 9:
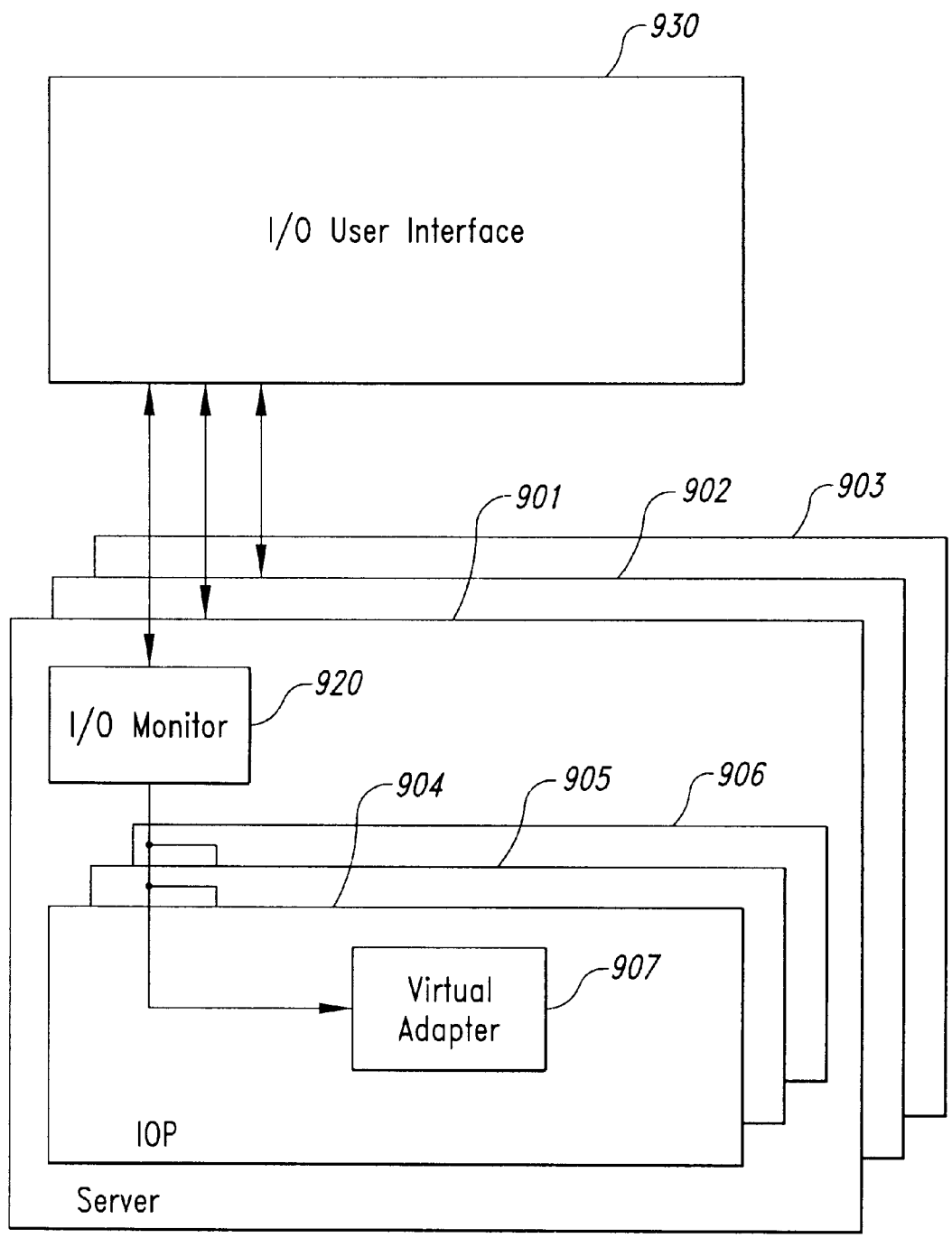
FIG. 9 illustrates an exemplary embodiment of the invention.

FIG. 9 illustrates an exemplary embodiment of the invention. In a computing system having multiple servers 901–903 where each server has multiple IOPs 904–906, a virtual adapter 907 may be added to each IOP to monitor $I_2O$ message traffic in the $I_2O$ device DDMs on the IOP board. The virtual adapters on each IOP board report $I_2O$ messages to an I/O monitor 920 for the server in which the IOP boards reside. The I/O monitors in the computing system's servers 901–903 report captured $I_2O$ messages to an I/O user interface 930.

The I/O monitor 920 preferably comprises an IBM-compatible personal computer having a Pentium processor with a minimum speed of 166 MHz, a peripheral component interconnect ("PCI") local bus, and a network interface adapter. The I/O user interface 930 preferably utilizes an IBM-compatible personal computer having a Pentium-II processor with a 266 MHz minimum speed, a network interface adapter, and a WINDOWS NT operating system.

The I/O user interface 930 includes a WINDOWS NT graphical user interface ("GUI") application program that accesses the virtual adapter's IxWorks DDM through standard WINDOWS NT device functions which can read the stored $I_2O$ message data from the virtual adapters. The WINDOWS NT GUI application program in the I/O user interface 930 also displays lists of time-stamped $I_2O$ messages as collected by all the virtual adapters. The WINDOWS NT GUI application program permits users to modify configuration settings effecting the monitored $I_2O$ devices and the types of $I_2O$ messages displayed, as well the content and format of the $I_2O$ message display itself.

Embodiments of the I/O user interface 930 utilize a standard WINDOWS 32 GUI application program interface ("API") via Microsoft Foundation Classes ("MFC"), and the Microsoft developer's studio to create standard WINDOWS 32 application windows, dialogs, and objects. The I/O user interface's programming code uses standard WINDOWS NT file handling system calls to access each virtual adapter's DDM on the IOP board as a standard NT system device, typically using system calls, such as create, open, read, write, and close.

The virtual adapter 907 runs on an IxWorks real-time operating system ("RTOS") running on an 80960Rx-based I/O processor board. Each of the IOPs 904–906 resides on a Cyclone 80960RP development board. The virtual adapter 907 operates as an IxWorks device driver that monitors and stores copies of $I_2O$ message traffic on its respective IOP. The virtual adapter 907 is configured as an $I_2O$ DDM so as to be automatically accessible by the I/O user interface's WINDOWS NT operating system.

The virtual adapter's IxWorks DDM monitors both incoming and outgoing $I_2O$ messages from all installed and operational $I_2O$ DDMs running on its IOP board. The IxWorks DDM saves some or all of the $I_2O$ messages (depending on configuration settings) and transfers them to the WINDOWS NT GUI of the I/O user interface 930. The IxWorks DDM allows IOP design engineers to add the virtual adapter when building the IxWorks configuration in an IOP so that the virtual adapter will initialize and be available to the I/O user interface 930 automatically upon start up of the IOP.

The IxWorks DDM uses less than 120 kB of IxWorks memory space and preferably less than 64 kB. The IxWorks DDM imposes a performance overhead of no more than 5% compared to the functions to which it is attached, both in terms of the volume of $I_2O$ messages sent by the virtual adapter and in the volume of DMA data required to send the messages. When installed but idled, the IxWorks' overhead is no more than 1%. The I/O user interface's WINDOWS NT GUI may configure the IxWorks DDM to define the amount of system resources used (buffer sizes) and the $I_2O$ message types collected. The I/O monitor 920, on average, utilizes no more than 3 percent of its local host CPU for its run-time statistics gathering and monitoring functions. Of course, this statistic will likely fluctuate, depending upon the number of devices monitored.

The virtual adapter's software uses and is compatible with a number of conventional interface specifications. The virtual adapter's virtual disk drive appears as a small computer system interface ("SCSI") random block device (e.g., a RAM disk drive). The virtual adapter's DDM module and its various tasks operate as threads under the IxWorks RTOS. As such, the virtual adapter's DDM module utilizes standard IxWorks and VxWorks system calls. The virtual adapter's DDM module also conforms to the $I_2O$ architecture specifications (Rev 1.5) for setting up a standard $I_2O$ DDM. The IxWorks operating system is a version of the VxWorks operating system that contains $I_2O$ specific system calls and $I_2O$ message dispatching mechanisms for $I_2O$ drivers. Thus, the $I_2O$ DDM interface is actually an integral part of the IxWorks programmatic interface.

The virtual adapter's DDM programming code may be linked directly into the resident IxWorks operating system on an IOP board on which it will function. This linkage occurs before or during installation of the IxWorks RTOS into memory on the IOP board. This process typically occurs at the manufacturing sites of $I_2O$ compliant IOP board and hardware device vendors who have purchased the virtual adapter software.

In the alternative, the virtual adapter's DDM may be dynamically loaded into IxWorks via the software download facility specified for $I_2O$ compliant systems. Capturing $I_2O$ messages using IxWorks may additionally involve some i960 assembly language programming and also some additional fine tuning using internal IxWorks tools. Capturing outgoing $I_2O$ messages may also require that the IxWorks programming code operate from the IOP's RAM in some hardware configurations.

It will be apparent to one skilled in the art that the various displays of $I_2O$ messages may be provided in ways other than shown in FIGS. 6A–6C and may include printed reports, other summaries, and annotated $I_2O$ message listings. It will also be apparent to one skilled in the art that additional characteristics of $I_2O$ devices may be monitored in addition to those specifically discussed herein. Furthermore, from the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A monitoring system in a computing system having at least one server that has a central processing unit and at least one input/output processor, comprising:

at least one virtual adapter that monitors input/output messages passing through the at least one input/output processor to produce message data; and an input/output user interface communicating with the at least one virtual adapter, the input/output user interface building a computing system communications model using the message data from the at least one virtual adapter.

2. The monitoring system of claim 1, further comprising:

an input/output monitor in communication with the at least one server that generates a server communications model for the at least one server using the message data produced by the at least one virtual adapter.

3. The monitoring system of claim 2 wherein the at least one server has at least another input/output processor, the monitoring system further comprising:

at least another virtual adapter on the at least one server that monitors input/output messages passing through the at least another input/output processor to produce other message data, wherein the input/output monitor generates the server communications model for the at least one server using the message data and the other message data.

4. The monitoring system of claim 2 wherein the computing system has at least another server having a central processing unit and at least another input/output processor, further comprising:

at least another virtual adapter on the at least another server that monitors input/output messages passing through the at least another input/output processor to produce other message data; and another input/output monitor that communicates with the at least another server and that generates a server communications model for the at least another server using the other message data produced by the at least another virtual adapter.

5. The monitoring system of claim 2 wherein the input/output monitor monitors device messages passing through the at least one server to produce device data and uses the device data and the message data to generate the server communications model.

6. The monitoring system of claim 2 wherein the input/output monitor stores the message data received from the at least one virtual adapter.

7. The monitoring system of claim 2 wherein the input/output user interface builds the computing system communications model using the server communications model.

8. The monitoring system of claim 1 wherein the server has at least another input/output processor, the system further comprising:

at least another virtual adapter that monitors messages passing through the at least another input/output processor to produce other message data, wherein the input/output user interface builds the computing system communications model using the message data and the other message data.

9. The monitoring system of claim 1 wherein the computing system has at least another server that has another central processing unit and has at least another input/output processor, the monitoring system further comprising:

at least another virtual adapter that monitors messages passing through the at least another input/output processor of the at least another server to produce other message data;

wherein the input/output user interface builds the computing system communications model using the message data and the other message data.

10. The monitoring system of claim 9, further comprising:
an input/output monitor associated with the at least one server that generates a server communications model for the at least one server using the message data produced by the at least one virtual adapter; and
another input/output monitor associated with the at least another server that generates another server communications model using the other message data produced by the at least another virtual adapter.

11. The monitoring system of claim 1 wherein the at least one virtual adapter produces message data by capturing input/output messages passing through the at least one input/output processor.

12. The monitoring system of claim 1 wherein the at least one virtual adapter analyzes the messages passing through the at least one input/output processor to determine a message type for each message analyzed.

13. The monitoring system of claim 1 wherein the at least one virtual adapter may be accessed throughout the computing system.

14. The monitoring system of claim 13 wherein the at least one virtual adapter has access characteristics of a disk drive.

15. The monitoring system of claim 1 wherein the at least one virtual adapter includes in the message data a timestamp for the monitored input/output messages.

16. The monitoring system of claim 1 wherein the virtual adapter filters the input/output messages based on at least one of an input/output device type or an input/output message type.

17. The monitoring system of claim 1 wherein the at least one virtual adapter includes programming code for inserting itself into an operating environment of the at least one input/output processor.

18. The monitoring system of claim 1 wherein the input/output user interface adjusts performance characteristics of the at least one virtual adapter.

19. The monitoring system of claim 1 wherein the input/output user interface presents a selectable view of the computing system communications model.

20. The monitoring system of claim 19 wherein the selectable view of the computing system communications model includes at least one of a three-dimensional plot showing utilization of the at least one input/output processor over time, cumulative input/output message utilization over time, and cumulative input/output message utilization in megabytes on the computing system over time.

21. A virtual adapter that monitors input/output messages transmitted in an input/output processor in a computing system having a central processing unit and communicates input/output message data to a monitoring system, comprising:
a message interface module that communicates the input/output message data to the monitoring system; and
an input/output message capture module that copies a portion of the input/output messages transmitted in the input/output processor to produce the input/output message data provided by the message interface module.

22. The virtual adapter of claim 21, further comprising:
an input/output message buffer that stores the copied portions of the input/output messages.

23. The virtual adapter of claim 21, further comprising:
a virtual disk addressable by the monitoring system that contains at least one virtual file, wherein reading of the at least one virtual file by the monitoring system causes the virtual adapter to send data associated with the at least one virtual file to the monitoring system.

24. The virtual adapter of claim 23 wherein writing to the at least one virtual file by the monitoring system causes the virtual adapter to receive new control data.

25. The virtual adapter of claim 21 wherein the message interface module communicates with an operating system of the input/output processor.

26. The virtual adapter of claim 21 wherein the monitoring system is an input/output user interface that builds a computing system communications model using the input/output message data.

27. The virtual adapter of claim 21 wherein the input/output processor resides in a server in the computing system and the monitoring system is an input/output monitor on the server and generates a server communications model using the input/output message data sent by the virtual adapter.

28. The virtual adapter of claim 27 wherein the input/output monitor receives the copied portion of input/output messages from the virtual adapter.

29. The virtual adapter of claim 21 wherein the input/output message capture module analyzes the input/output messages passing through the one input/output processor to determine a message type for each message.

30. The virtual adapter of claim 21 wherein the input/output message capture module timestamp each copied portion of the input/output messages.

31. The virtual adapter of claim 21 wherein the virtual adapter filters the input/output messages based on at least one of an input/output device type or an input/output message type.

32. The virtual adapter of claim 21 wherein the message interface modules includes programming code for inserting itself into an operating environment of the input/output processor.

33. A method for monitoring a computing system having at least one server that has a central processing unit and has at least one input/output processor, the method comprising:
monitoring input/output messages passing through the at least one input/output processor by a virtual adapter that produces message data; and
generating a server communications model using the message data provided by the virtual adapter.

34. The method of claim 33 wherein generating the server communications model comprises:
transferring the message data from the virtual adapter to a remote input/output user interface, in communication with the virtual adapter, that generates the server communications model.

35. The method of claim 33, further comprising:
providing user selectable views of the server communications model in an input/output user interface.

36. The method of claim 33 wherein the server has at least one other input/output processor, the method further comprising:
monitoring input/output messages passing through the at least one other input/output processor by at least one other virtual adapter that produces other message data; and
generating the server communications model using the message data and the other message data.

37. The method of claim 33 wherein the computing system has at least one other server that has another central processing unit and has at least one input/output processor, the method further comprising:
monitoring input/output messages passing through the at least one other input/output processor of the at least one other server by at least one other virtual adapter that produces other message data; and producing a computing system communications model using the message data and the other message data.

38. The method of claim 33, further comprising:

analyzing the input/output messages passing through the at least one input/output processor to determine a message type for each input/output message monitored.

39. The method of claim 33, further comprising:

making the virtual adapter accessible throughout the computing system by generating a virtual disk for the virtual adapter.

40. The method of claim 33, further comprising:

timestamping the monitored input/output messages placed in the message data by the at least one virtual adapter.

41. The method of claim 33, further comprising:

inserting the virtual adapter into an operating environment of the at least one input processor.

42. The method of claim 33, further comprising:

adjusting performance characteristics of the virtual adapter through commands sent from an input/output user interface.

43. The method of claim 33, further comprising providing selectable views of the server communications model, wherein the selectable view of the server communications model includes at least one of a three-dimensional plot showing utilization of the input/output processor over time, cumulative input/output message utilization over time, and cumulative input/output message utilization in megabytes on the server over time.

44. The method of claim 33, further comprising:

filtering the input/output messages passing through the computing system using selectable filters.

45. The method of claim 44 wherein the selectable filters filter the input/output messages based on at least one of an input/output device type or an input/output message type.

46. A method for monitoring input/output messages transmitted in an input/output processor in a computing system having a central processing unit and communicating input/output message data to a monitoring system, comprising:

communicating the input/output message data to the monitoring system from a message interface module associated with the input/output processor; and copying a portion of the input/output messages transmitted in the input/output processor to produce the input/output message data.

47. The method of claim 46, further comprising:

storing the copied portions of the input/output messages in an input/output message buffer associated with the input/output processor.

48. The method of claim 46, further comprising:

creating a virtual disk on the input/output processor that is addressable by the monitoring system and contains at least one virtual file; and reading the at least one virtual file by the monitoring system to cause data associated with the at least one virtual file to be sent to the monitoring system.

49. The method of claim 48, further comprising:

writing to the at least one virtual file from the monitoring system to download new control data.

50. The method of claim 46 wherein the message interface module communicates with an operating system on the input/output processor.

51. The method of claim 46 wherein the monitoring system is an input/output user interface in the computing system, further comprising:

building a computing system communications model the input/output message data from the message interface module.

52. The method of claim 46 wherein the monitoring system resides in a server in the computing system, further comprising:

generating a server communications model using the input/output data.

53. The method of claim 52 wherein the server communications model is produced in an input/output monitor that receives the copied portion of the input/output messages from the virtual adapter.

54. The method of claim 46, further comprising:

analyzing the input/output messages passing through the input/output processor to determine a message type for each message.

55. The method of claim 46, further comprising:

associating a timestamp with each copied portion of the input/output messages by the message capture module.

56. The method of claim 46, further comprising:

filtering the input/output messages based on at least one of an input/output device type or an input/output message type.

57. The method of claim 46 wherein the message interface module inserts itself into an operating environment of the input/output processor.

58. A computer-implemented method for monitoring a computing system having at least one server that has a central processing unit and has at least one input/output processor, comprising:

monitoring input/output messages passing through the at least one input/output processor by a virtual adapter that produces message data; and generating a server communications model using the message data provided by the virtual adapter.

59. The computer-implemented method of claim 58 wherein generating the server communications model comprises:

transferring the message data from the virtual adapter to a remote input/output user interface, in communication with the virtual adapter, that generates the server communications model.

60. The computer-implemented method of claim 58, further comprising:

providing user selectable views of the server communications model in an input/output user interface.

61. The computer-implemented method of claim 58 wherein the server has at least one other input/output processor, the computer-implemented method further comprising:

monitoring input/output messages passing through the at least one other input/output processor by at least one other virtual adapter that produces other message data; and generating the server communications model using the message data and the other message data.

62. The computer-implemented method of claim 58 wherein the computing system has at least one other server that has another central processing unit and has at least one input/output processor, the computer-implemented method further comprising:

monitoring input/output messages passing through the at least one other input/output processor of the at least one other server by at least one other virtual adapter that produces other message data; and producing a computing system communications model using the message data and the other message data.

63. The computer-implemented method of claim 58, further comprising:

analyzing the input/output messages passing through the at least one input/output processor to determine a message type for each input/output message monitored.

64. The computer-implemented method of claim 58, further comprising:

making the virtual adapter accessible throughout the computing system by generating a virtual disk for the virtual adapter.

65. The computer-implemented method of claim 58, further comprising:

timestamping the monitored input/output messages placed in the message data by the at least one virtual adapter.

66. The computer-implemented method of claim 58, further comprising:

inserting the virtual adapter into an operating environment of the at least one input processor.

67. The computer-implemented method of claim 58, further comprising:

adjusting performance characteristics of the virtual adapter through commands sent from an input/output user interface.

68. The computer-implemented method of claim 58, further comprising providing selectable views of the server communications model, wherein the selectable view of the server communications model includes at least one of a three-dimensional plot showing utilization of the input/output processor over time, cumulative input/output message utilization over time, and cumulative input/output message utilization in megabytes on the server over time.

69. The computer-implemented method of claim 58, further comprising:

filtering the input/output messages passing through the computing system using selectable filters.

70. The computer-implemented method of claim 69 wherein the selectable filters filter the input/output messages based on at least one of an input/output device type or an input/output message type.

* * * * *